(12) United States Patent
Edge et al.

(10) Patent No.: US 11,841,450 B2
(45) Date of Patent: Dec. 12, 2023

(54) LOCATING A DEVICE USING A REFERENCE POINT TO ALIGN LOCATION INFORMATION

(71) Applicant: QUALCOMM Incorporated, San Diego, CA (US)

(72) Inventors: Stephen William Edge, Escondido, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 16/157,803

(22) Filed: Oct. 11, 2018

(65) Prior Publication Data

US 2019/0041487 A1 Feb. 7, 2019

Related U.S. Application Data

(63) Continuation of application No. 13/250,224, filed on Sep. 30, 2011, now Pat. No. 10,267,892.

(Continued)

(51) Int. Cl.
*G01S 5/02* (2010.01)

(52) U.S. Cl.
CPC .......... *G01S 5/0236* (2013.01); *G01S 5/0284* (2013.01)

(58) Field of Classification Search
CPC .............................. G01S 5/0284; G01S 5/0236
See application file for complete search history.

(56) References Cited

U.S. PATENT DOCUMENTS

| 5,986,604 A | 11/1999 | Nichols et al. |
| 6,417,801 B1 | 7/2002 | Van |

(Continued)

FOREIGN PATENT DOCUMENTS

| CN | 101175082 A | 5/2008 |
| CN | 101336555 A | 12/2008 |

(Continued)

OTHER PUBLICATIONS

ETSI TS 136 355 V9.2.1; LTE; Evolved Universal Terrestrial Radio Access (E-UTRA); LTE Positioning Protocol (LPP) (3GPP TS 36.355 version 9.2.1 Release 9), (Jul. 2010), pp. 1-114.

(Continued)

*Primary Examiner* — Michael J Dalbo
*Assistant Examiner* — Kaleria Knox
(74) *Attorney, Agent, or Firm* — Thien T. Nguyen

(57) ABSTRACT

In a particular embodiment, a method includes receiving a first set of location data and a second set of location data at a mobile device. The method includes locating a first reference point identifier that is included in the first set of location data and a second reference point identifier that is included in the second set of location data. The first reference point identifier field and the second reference point identifier field identify a common reference point. The method includes identifying first information in the first set of location data that is associated with the common reference point. The method also includes identifying second information in the second set of location data that is associated with the common reference point and spatially aligning the first set of location data with the second set of location data based on the common reference point to associate the first information with the second information.

30 Claims, 8 Drawing Sheets

Related U.S. Application Data

(60) Provisional application No. 61/391,666, filed on Oct. 10, 2010, provisional application No. 61/389,703, filed on Oct. 4, 2010.

(56) References Cited

U.S. PATENT DOCUMENTS

| | | | |
|---|---|---|---|
| 7,254,402 B2* | 8/2007 | Vayanos | G01S 19/05 455/456.1 |
| 7,421,275 B1 | 9/2008 | Hancock et al. | |
| 7,454,217 B2 | 11/2008 | Edge et al. | |
| 8,060,344 B2* | 11/2011 | Stathis | G01C 15/002 703/1 |
| 8,289,154 B2 | 10/2012 | Kodrin et al. | |
| 8,340,682 B2 | 12/2012 | Taylor et al. | |
| 8,473,241 B2 | 6/2013 | Foxlin | |
| 8,600,297 B2 | 12/2013 | Ketchum et al. | |
| 8,700,051 B2 | 4/2014 | Burroughs | |
| 8,805,400 B2 | 8/2014 | Islam et al. | |
| 2002/0149515 A1 | 10/2002 | Alanen et al. | |
| 2003/0092380 A1 | 5/2003 | Soliman et al. | |
| 2003/0125045 A1 | 7/2003 | Riley et al. | |
| 2005/0037786 A1 | 2/2005 | Edge | |
| 2005/0094610 A1 | 5/2005 | De et al. | |
| 2007/0260628 A1 | 11/2007 | Fuchs et al. | |
| 2007/0288160 A1 | 12/2007 | Ebert | |
| 2008/0183384 A1 | 7/2008 | Gaal et al. | |
| 2008/0228654 A1 | 9/2008 | Edge | |
| 2009/0177382 A1 | 7/2009 | Alles et al. | |
| 2010/0106801 A1 | 4/2010 | Bliss et al. | |
| 2010/0109864 A1 | 5/2010 | Haartsen et al. | |
| 2010/0145602 A1 | 6/2010 | Morris | |
| 2010/0318289 A1 | 12/2010 | Sambongi | |
| 2011/0064312 A1 | 3/2011 | Janky et al. | |
| 2011/0201332 A1* | 8/2011 | Siomina | H04W 64/00 455/434 |
| 2011/0280453 A1 | 11/2011 | Chen et al. | |
| 2011/0282578 A1 | 11/2011 | Miksa et al. | |
| 2012/0015667 A1* | 1/2012 | Woo | G01S 1/20 455/456.1 |
| 2012/0083288 A1* | 4/2012 | Siomina | H04W 64/00 455/456.1 |
| 2012/0136623 A1 | 5/2012 | Edge et al. | |
| 2012/0322465 A1 | 12/2012 | Huang et al. | |

FOREIGN PATENT DOCUMENTS

| | | |
|---|---|---|
| CN | 101370259 A | 2/2009 |
| CN | 101600150 A | 12/2009 |
| CN | 101765203 A | 6/2010 |
| CN | 101903746 A | 12/2010 |
| JP | H10136436 A | 5/1998 |
| JP | 2003130680 A | 5/2003 |
| JP | 2003209869 A | 7/2003 |
| JP | 2003281154 A | 10/2003 |
| JP | 200307141 | 12/2003 |
| JP | 2004062602 A | 2/2004 |
| JP | 2007121226 A | 5/2007 |
| JP | 2009528555 A | 8/2009 |
| JP | 2009225132 A | 10/2009 |
| JP | 2010169593 A | 8/2010 |
| JP | 2012507701 A | 3/2012 |
| TW | 200848702 A | 12/2008 |
| TW | 200912255 A | 3/2009 |
| TW | 200942057 A | 10/2009 |
| TW | 201024786 A | 7/2010 |
| WO | WO-2008006062 A1 | 1/2008 |
| WO | WO-2008112819 A2 | 9/2008 |
| WO | WO-2010135657 A1 | 11/2010 |
| WO | WO-2011014213 | 2/2011 |

OTHER PUBLICATIONS

European Search Report—EP14196927—Search Authority—Munich—dated Dec. 8, 2011.
International Search Report and Written Opinion—PCT/US2011/054497—ISA/EPO—dated Mar. 12, 2014.
Taiwan Search Report—TW100135814—TIPO—dated Mar. 12, 2014.
Taiwan Search Report—TW105129505—TIPO—dated Aug. 5, 2017.
Taiwan Search Report—TW103121605—TIPO—dated Jan. 28, 2016.
"Userplane Location Protocol; Draft Version 2.0, Mar. 14, 2008; OMA-TS-ULP-V2_0-20080314-D, Open Mobile Alliance," Internet Citation, Mar. 14, 2008, pp. 1-24, XP007912187.
Andreas Wachter: "SUPL3_0_RD_Relative_Position", Open Mobile Alliance, Oct. 12, 2009 (Oct. 12, 2009), pp. 1-3, XP002664540, Retrieved from the Internet: URL:http://member.openmobilealliance.org/ftp/public_documents/loc/2009/OMA-LOC-2009-0251-CR_SUPL3_0_RD_relative_position.zip [retrieved on Nov. 25, 2011].

* cited by examiner

LOCATING A DEVICE USING A REFERENCE POINT TO ALIGN LOCATION INFORMATION

I. PRIORITY

This application is a continuation of and claims priority to U.S. application Ser. No. 13/250,224, entitled "Locating a Device Using a Reference Point to Align Location Information," filed Sep. 30, 2011, which claims under 35 USC § 119 the benefit of and priority to U.S. Provisional Application No. 61/389,703, entitled "Use of Reference Points to Align Location and Assistance Data," filed Oct. 4, 2010 and U.S. Provisional Application No. 61/391,666, entitled "Use of Reference Points to Align Location and Assistance Data," filed Oct. 10, 2010, all of which are assigned to the assignee hereof and are incorporated by reference herein in their entireties.

II. FIELD

The present disclosure is generally related to estimating device location.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Since wireless devices are typically mobile, the ability to locate a wireless device may often be useful. For example, the known geographic location of a wireless device may be used to support applications like navigation, direction finding, locating points of interest, managing assets and locating users. In addition, when the user of a wireless device invokes an emergency call, the location of the wireless device may need to be delivered to a Public Safety Answering Point according to national regulation. The ability to locate a device may also be useful for a device that can access a wireline network instead of or in addition to a wireless network in the case that the device is nomadic or mobile.

Locating a mobile (or nomadic) device can be accomplished by making use of location related measurements (e.g. measurements of global positioning system (GPS) satellites or nearby network base stations) obtained by the device and/or by a serving network. Such measurements and the computation of a location estimate, in the case that these are obtained by the device, may be enabled or assisted by transferring location related information, sometimes referred to as assistance data, from a network (e.g. from a location server attached to or within a network) to the device. Assistance data transferred to a mobile device can include various types of data including data related to a serving network and map data related to the geographic area the mobile device is located within. For example, a mobile device may receive information indicating locations of a set of nearby base stations in the serving network and may estimate a location of the mobile device by measuring signals from some of the base stations. As another example, a mobile device may include an application that enables a user to navigate based on map data and based on an estimated location of the mobile device. However, different types of location related information (e.g. base station locations, Wi-Fi access point locations), as well as different types of map data, may be provided by different information providers using different proprietary layouts and data structures. For example, a first type of data may identify positions of base stations using longitude and latitude data while a second type of data may identify positions of Wi-Fi access points using civic location data, such as street address, building floor, and room number or using positions marked on a map with no directly defined geographic or civic location. As a result, a mobile device may be unable to relate the positions of the base stations with the positions of the Wi-Fi access points or may be unable to relate the positions of bases stations or Wi-Fi access points to physical objects and structures (e.g. buildings, walls, floors) that may influence how signals will be detected and measured.

IV. SUMMARY

Using reference points to locate a device enables alignment of multiple sets of data. One or more reference points may be included or referenced by each set of data, such as assistance data, map data, or other location-based data. The use of reference points enables a device, such as a wireless telephone or a location server, to align different sets of data and to use information from one set of data in conjunction with information from another set of data.

In a particular embodiment, a method includes receiving a first set of location data and a second set of location data at a mobile device. The method includes locating a common reference point identifier that is included in the first and second sets of location data. The common reference point identifier identifies a common reference point. The method includes identifying first information in the first set of location data that is associated with the common reference point. The method also includes identifying second information in the second set of location data that is associated with the common reference point and spatially aligning the first set of location data with the second set of location data based on the common reference point to associate the first information with the second information.

In a particular embodiment, a mobile device includes a reference point locator configured to receive a first set of location data and a second set of location data and to recover a common reference point based on a reference point identifier that does not include location coordinates from the first set of location data and from the second set of location data. The mobile device includes a location data identifier configured to identify first information in the first set of location data that is associated with the common reference point and to identify second information in the second set of location data that is associated with the common reference point. The mobile device includes a location data aligner configured to spatially align the first set of location data with the second set of location data based on the common reference point to associate the first information with the second information.

In another embodiment, a method includes locating a first reference point identifier that is included in a first set of location data and a second reference point identifier that is included in a second set of location data. The first reference point identifier and the second reference point identifier identify a common reference point. First information in the first set of location data that is associated with the common reference point is identified. Second information in the second set of location data that is associated with the common reference point is identified. The first set of location data is spatially aligned with the second set of location data based on the common reference point to associate the first information with the second information.

In another embodiment, a location server includes a reference point locator configured to locate a first reference point identifier that is included in a first set of location data and a second reference point identifier that is included in a second set of location data. The first reference point identifier and the second reference point identifier identify a common reference point. The location server includes a location data identifier configured to identify first information in the first set of location data that is associated with the common reference point and to identify second information in the second set of location data that is associated with the common reference point. The location server includes a location data aligner configured to spatial align the first set of location data with the second set of location data based on the common reference point to associate the first information with the second information.

In another particular embodiment, a method includes sending, by a mobile device, a message to a location server, the message indicating a reference point capability of the mobile device according to a positioning protocol.

In another particular embodiment, the method includes sending, by a mobile device, a message to a location server, the message indicating a request for assistance data and including a reference point indication.

In another particular embodiment, the method includes sending, by a location server, a message to provide assistance data to the mobile device, the message including an indication of a default reference point.

In another particular embodiment, the method includes sending, by a location server, a message to provide assistance data to the mobile device, the message including indications of locations of signal sources relative to a reference point.

In another particular embodiment, the method includes sending, by a location server, a request for a mobile device to report a position of the mobile device relative to a reference point, wherein the request includes an indicator of the reference point.

In another particular embodiment, the method includes sending, by a mobile device, a message including location information to a location server, where the location information indicates a reference point and indicates a location of the mobile device in a local coordinate system having an origin defined by the reference point.

One particular advantage provided by at least one of the disclosed embodiments is enabling device location to be performed using information from various types of location data to enable more accurate position estimation as compared to using multiple types of location data without having well-defined relationships to relate the multiple types of location data to each other.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
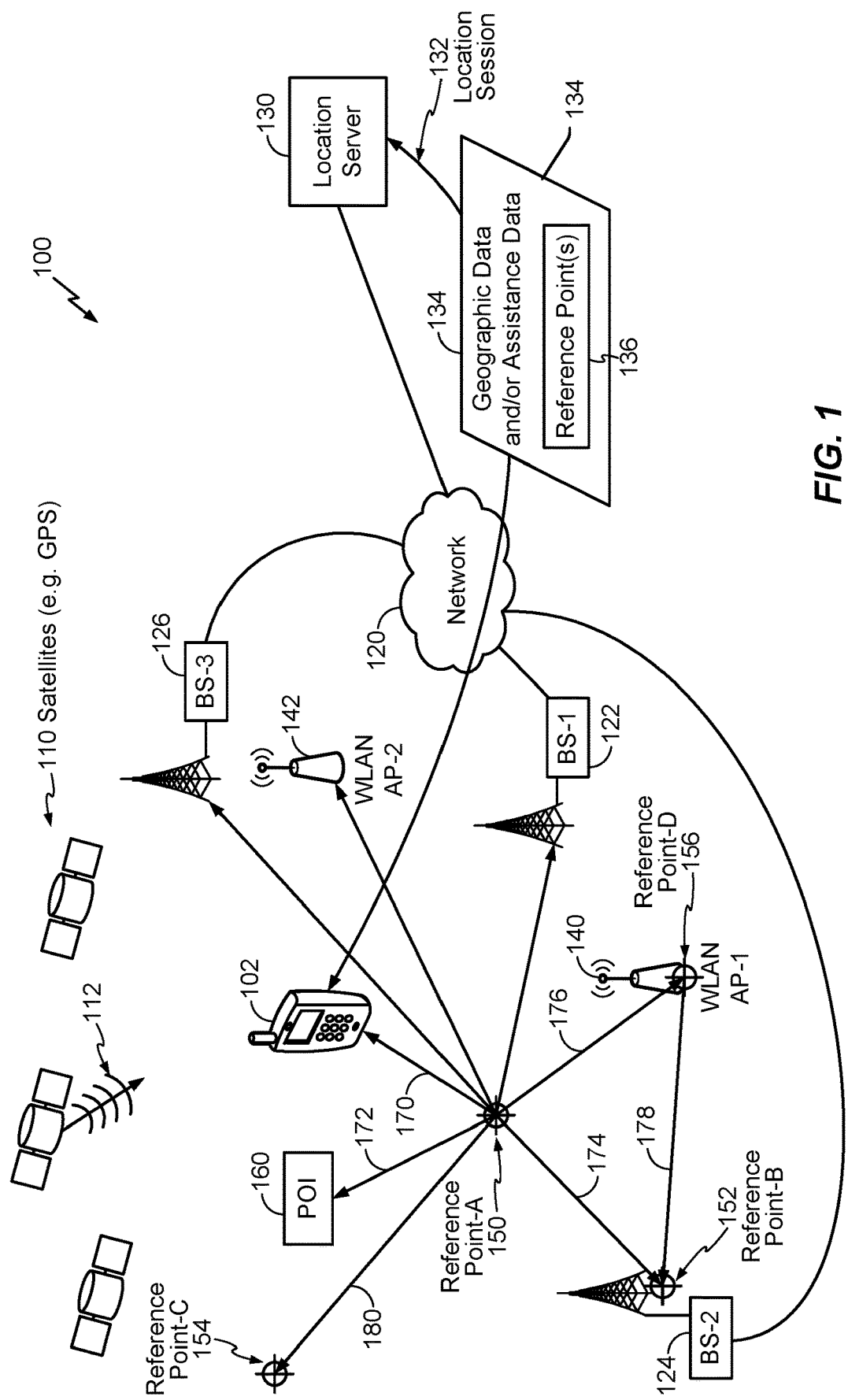
FIG. 1 is a general diagram of a particular embodiment of a system illustrating use of reference points for location information.

Location related information may include information about a location of a particular entity, device, person, or point of interest (POI), information about a geographic area surrounding or nearby the location, information that may assist in the derivation or determination of the location of the particular entity, device, person or point of interest, or any combination thereof. Location related information may be defined and provided in separate portions, such as in separate data sets and/or via separate messages. For example, locations of nearby terrestrial transmitters, such as base stations, Wi-Fi® access points (APs), femtocells, Bluetooth® access points, or other radiofrequency (RF) signal devices, may be provided separately or together as a set of geographical location coordinates (e.g. latitude and longitude). (Wi-Fi® is a registered trademark of Wi-Fi Alliance, a California Corporation; Bluetooth® is a registered trademark of Bluetooth SIG, Inc., a Delaware Corporation.) Alternatively, or in addition, locations may be provided as a set of civic location descriptions. For example, a Wi-Fi access point location may be provided as a postal address of a building and floor, room and position information within the building where the Wi-Fi access point is located. These locations may be used to assist a mobile wireless device to acquire and measure signals from some of these located devices in order to estimate a location of the mobile device. The locations may also or instead be used to enable a mobile device or a location server to infer relationships between the location of the mobile device and the location(s) of one or more terrestrial transmitters based on measurements of these transmitters made by the mobile device. For example, using signal timing measurements obtained for a number of nearby base stations, a mobile device or location server may be able to infer that the mobile device is located within a certain small area or along a certain line or path (e.g. a hyperbola in the case of timing measurements obtained for a pair of base stations). Such location estimation may occur at the mobile device or at a server that receives signal measurements from the mobile device.

Map data may be provided to a mobile device independent of location related information. The map data may further assist the mobile device to generate a location estimate and/or to make measurements to obtain a location estimate from a remote server. For example, map data may indicate a layout of streets and buildings in a city or an internal layout of rooms and corridors inside a building. Map data indicating such layouts may assist a mobile device in predicting how signals from various base stations and access points will be attenuated, blocked, and reflected. Based on the map data, the mobile device may predict which signals, signal levels and signal timing the mobile device would expect to measure at different locations. The mobile device may be able to use signal measurements (e.g. signal strength, signal quality, signal timing) to improve an accuracy of a location estimate by relating the actual measurements to predicted measurements based on map data. Such improvements of location accuracy may be greater if the mobile device is able to receive and correlate not only map data but also information regarding the locations and transmission characteristics (e.g. transmission power, transmission timing, antenna characteristics) of nearby base stations and access points. However, typically, map data would be restricted to showing outdoor and/or indoor geography whereas information on base stations and access points would be separate and not directly associated with map data. Therefore, potential improvements in location accuracy that could be obtained by combining all data in a precise manner may not be realized.

Other map data including points of interest may be provided to a mobile device (e.g. at an application level) to enable the mobile device or a user of the mobile device to use location information (e.g. a location estimate of the device). For example, map data may be used with a location estimate to enable a mobile device to identify nearby points of interest, to provide directions to some particular point of interest or to determine distances and travel times to other points of interest. Further, other data may be provided to a mobile device with location related relevance to enable other actions and benefits, such as weather forecasts over a period of time for a particular area, traffic flow information, either predicted or measured for a set of streets or whole town or city, hazard related information (e.g. concerning a fire or flood), shopping related information (e.g. concerning a sale event), entertainment and dining related information (e.g. identification of a nearby Italian or French restaurant or directions to a nearby cinema or theatre), public transport related information (e.g. directions to a nearby railway or subway station), or any combination thereof.

Location related information, map data, and other data may be provided to a mobile device or may be provided to one or more other entities or devices that may use location related information and/or the location of the mobile device.

Such location related information, map data, and other data may be provided as separate data sets. Each data set may be contained within a single message or set of associated messages when being transported, such as from a location server to a mobile device. In addition, each data set may be stored within a device or entity as a single data structure or as a set of associated data structures. The information within each individual data set may be coordinated, e.g. different locations represented within the data set may have known and well-defined relationships to one another so that relative locations are either provided in the data set or are easily obtained from the data set.

This coordination may not apply, however, between location information contained in different data sets. For example, a map could be provided of some local area (e.g. a building or town) in a data set "A" while locations and transmission characteristics of base stations and access points within the same local area might be provided in some other data set "B." If the data set A does not contain any absolute location information (e.g. latitude and longitude is not provided for any point on the map) and the data set B does not contain any features shown on the map, then it may be difficult to relate data set A with data set B. For example, it may be difficult to determine a location on the map of a particular base station or access point in data set B or to determine which base stations and access points may be closest to or coincident with a particular point on the map.

Even if data set A contains some absolute location information (e.g. location coordinates of a particular point of interest represented on the map), it may still be difficult to accurately relate data set A with data set B because of inaccuracy in location information of both data sets. For example, if there is a map point with a provided absolute location in data set A with an unknown error of 20 meters (e.g. due to surveying or location measurement errors) and if there is a base station in data set B with a provided location that has a separate unknown error of 20 meters, then a relationship between the two locations (e.g. a relative location of one versus the other) will have an unknown error of anywhere between zero meters (if both errors were identical) and 40 meters (if both errors were opposite). Even if such errors are removed (e.g. by ensuring equal errors in both data sets via use of the same method, such as surveying, for obtaining locations), other problems may emerge if location data for one or both data sets is later revised (e.g. revised with more accurate locations). In this case, if a revised version of the data set A is provided to an entity or device that already has an older version of the data set B, an initial alignment between the older versions of the data sets may no longer provide accurate results with the newer version of the data set A.

Alignment of different data sets that contain location related information to be combined in order to support various location capabilities and location related applications and services may be enabled via use of reference points. References points can be used to associate and provide data layering of different data sets.

A Reference Point may be associated with a particular fixed location, such as a point location, that may have some physical significance and can be defined. As an example, a reference point could be associated with the location of the front doorway into a particular building, the North West corner of a particular rectangular building with unambiguous north and west sides, the intersection of two particular streets, a particular departure gate in an airport, the entrance into a particular shop within a shopping mall, a monument (e.g. statue or column) in a public square, a particular entrance or gate to a platform at a railway station, a receptionist's desk in a hospital or library, the entrance on the tenth floor to a particular elevator in a tall building, etc. In such cases, additional information may be provided to pinpoint the location associated with the reference point very precisely—e.g. in the case of a public monument, the location could be ground level of the center of the monument assuming the monument was symmetrical enough (e.g. circular or a square) to have an unambiguous center. The location of a reference point could also be defined using a map in which case no special physical description might be provided (though a physical description might be useful) since the location can be marked anywhere on the map and thereafter related to nearby features on the map. As an example, a location for a reference point marked on a map of a building in which the location was at the center of the front doorway would have an immediate and obvious geographic relationship to features of the building depicted on the map nearby to the front doorway. The location of a reference point could also be defined using the coordinates of the location—e.g. such as by giving the exact latitude, longitude and altitude. In this case, the reference point may have no association with a particular physical object or structure but can still be located on any map that includes coordinates.

Reference points may be used to associate the data belonging to different data layers or data sets. A data layer, also referred to herein as a data set, may be a set of data (e.g. a map, a set of base station locations and/or base station transmission characteristics or, a set of geographic points of interest) that has some exact or approximate relationship to either a particular two-dimensional geographic area on or near the Earth's surface or a particular three-dimensional geographic volume on, above, and/or below the Earth's surface. The set of data may contain information that is related implicitly or explicitly to the particular geographical area or volume. An explicit relationship may be provided when absolute location coordinates or civic location descriptions are provided within the data set. An implicit relationship may be provided when data can be related to sub-areas, sub-volumes or points of the geographical area or volume by matching patterns or images—e.g. matching the shape of a building or contour of a street represented on a map with real images. Different data layers may thus refer to the same two-dimensional or three-dimensional geographical area or volume. Aligning the data layers may be performed to superimpose one layer on another using the same scale, orientation and alignment of common reference points. Aligned data layers may enable data provided in one data layer to be related to data provided in another data layer.

Referring to FIG. 1, a system illustrating use of reference points for location information is depicted and generally designated 100. The system 100 includes a mobile device 102 in communication with a location server 130 via a network 120 and in proximity to a point of interest (POI) 160. The system 100 includes multiple base stations, such as a first representative base station 122, a second representative base station 124, and a third representative base station 126. Each of the base stations 122, 124, 126 is coupled to the network 120. The Network 120 may be a wireline network or a wireless network, such as a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax or other network. A CDMA network may implement one or more radio access technologies (RATs) such as CDMA2000, or Wideband-CDMA (W-CDMA), as illustrative examples. CDMA2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. Mobile device 102 may be a cellular or other wireless communication device, a personal communication system (PCS) device, a personal navigation device (PND), a Personal Information Manager (PIM), a Personal Digital Assistant (PDA), a laptop or other suitable mobile device that is capable of receiving wireless and/or wireline communication. The mobile device 102 may be referred to as a device, a mobile terminal, a terminal, mobile target, target, User Equipment (UE), a Mobile Station (MS) or by some other name.

The system 100 also includes multiple satellites 110 of a global navigation satellite system (GNSS), such as satellites belonging to the US Government Global Positioning System (GPS), the Russian GLONASS system or the European Galileo system. The system 100 includes multiple wireless local area network (WLAN) access points, such as a first WLAN access point 140 and a second WLAN access point 142. Each of the WLAN access points may be coupled to a network 120 or may be coupled to other networks not shown in FIG. 1. Multiple reference points are illustrated relative to one or more components in the system 100. A first reference point "A" 150 is illustrated relative to which the mobile device 102 has the position 170. A second reference point "B" 152 is co-located with the second base station 124. A third reference point "C" 154 is illustrated, and a fourth reference point "D" 156 is co-located with the first WLAN access point 140.

The mobile device 102 may be configured to receive information, such as geographic data and/or assistance data 134, via a location session 132 with the location server 130. For example, the location server 130 may be a Secure User Plane Location (SUPL) Location Platform (SLP) as defined by the Open Mobile Alliance (OMA) and the location session 132 may be a location session according to SUPL 1.0, SUPL 2.0 or SUPL 3.0 as defined in OMA publicly available documents OMA-TS-ULP-V1_0-20070615-A, OMA-TS-ULP-V2_0-20110527-C, OMA-TS-ULP-V3_0-20110907-D, respectively. The location session may further support one or more positioning protocols in order to transfer positioning capability information, assistance data and location measurement or location estimate information between the mobile device 102 and the location server 130. In the case of a SUPL location session, both the SUPL service protocol, known as the User Plane Location Protocol (ULP), and the positioning protocol may be supported in an end to end manner by and between the mobile device 102 and the location server 130 with the ULP protocol carrying the positioning protocol. The positioning protocol may be LPP or LPP plus LPPe. LPP is defined by 3GPP in 3GPP Technical Specification (TS) 36.355 which is publicly available and LPPe is defined by OMA in OMA TS OMA-TS-LPPe-V1_0 which is publicly available. The location server 130 may be referred to as a server and may be an SLP, a Serving Mobile Location Center (SMLC) defined by 3GPP, a Position Determining Entity (PDE) defined by 3GPP2, a Standalone SMLC (SAS) defined by 3GPP or some other type of server.

The mobile device 102 may be configured to receive the geographic data and/or assistance data 134 (e.g. conveyed by LPP or LPP/LPPe using SUPL) and to retrieve information corresponding to one or more reference points 136. For example, the geographic data and/or assistance data 134 may include a list of locations of the base stations 122, 124, 126 relative to reference point A 150. For example, the geographic data and/or assistance data 134 may include a relative location 174 of the second base station 124 relative to reference point A 150. The relative location 174 may provide the signed difference between the latitude, longitude and altitude of the reference point A 150 and the second base station 124. Alternatively, the relative location may 174 may provide the signed distances (e.g. in meters) by which the base station 124 is north and east of the reference point A 150 and higher or lower than the reference point A 150 relative to sea level. Other means of specifying the relative location 174 can also be employed—e.g. the straight line distance from the reference point A 150 to the base station 124 and the azimuth and elevation of this straight line. These means of specifying relative location may be applied to other relative locations—e.g. the relative locations 170 and 172. The geographic data and/or assistance data 134 may also include relative locations of the first base station 122 and the third base station 126 relative to reference point A 150, illustrated as directional arrows in FIG. 1. The geographic data and/or assistance data 134 may further include the identities and transmission characteristics of the base stations 122, 124, 126 and the access points 140, 142—e.g. the global and local identities of the associated base station cells, global access point Media Access Control (MAC) addresses, transmission power, coverage area, transmission timing, antenna type, gain, direction and elevation. The data 134 may further include the identities (e.g. global names) of the reference points 150, 152, 154, 156, their absolute location coordinates (e.g. absolute longitude and latitude) and may include map data (e.g. map of part of a city area including a representation of streets and buildings or a map of one or more floors inside a building). One or more of the reference points 150, 152, 154, 156 may be included in the map data by indicating for each reference point a position on the map and the global name of the reference point.

The geographic data and/or assistance data 134 may further include information relating positions of the access points 140 and 142 relative to reference point A 150. For example, the geographic data and/or assistance data 134 may include a relative position 176 (illustrated as an arrow from reference point A 150 to the first access point 140) indicating a relative position of the first access point 140 with respect to reference point A 150. In other embodiments, the geographic data and/or assistance data 134 may further include information providing a location of the point of interest 160 relative to one or more of the reference points 150, 152, 154, 156 (such as the location 174 of reference point B 152 relative to reference point A 150). Further, the information corresponding to one or more reference points 136 may include an indication of relative positions of one or more of the reference points 150, 152, 154, 156 relative to one or more others of the reference points 150, 152, 154, 156. For example, the reference point information 136 may indicate a relative position 180 of reference point C 154 relative to reference point A 150 and a relative position 178 of reference point B 152 relative to reference point D 156.

In a particular embodiment, the mobile device 102 is configured to receive the geographic data and/or assistance data 134 from the location server 130 and to combine information using one or more of the reference points 150, 152, 154, 156. For example, the mobile device 102 may be configured to receive relative locations of the base stations 122, 124, 126 relative to the reference point A 150 and to further receive locations of the access points 140 and 142 relative to the reference point A 150. The mobile device 102 may further be configured to determine its relative location 170 relative to the reference point A 150 using combined data including locations and transmission characteristics of base stations and locations and transmission characteristics of access points to generate an accurate estimate of a location of the mobile device 102. For example, the mobile device 102 may measure signal strengths and/or timing of signals from one or more of the base stations 122, 124, 126 and from one or more of the access points 140 and 142 to generate a location estimate.

In addition, the mobile device 102 may be configured to determine locations of one or more elements of geographic data, such as the point of interest 160, relative to one or more elements from another set of data, such as relative to positions of the base stations 122, 124, 126. For example, the mobile device 102 may be configured to determine a relative position of the point of interest 160 relative to the second base station 124 based on a relative location 172 of the point of interest 160 relative to reference point A 150 and based on the relative location 174 of the second base station 124 relative to reference point A 150.

During operation, the mobile device 102 may receive one or more sets of geographic data and/or assistance data 134 and may perform positioning operations based on the information corresponding to one or more reference points 136 of the received data. For example, the mobile device 102 may initiate the location session 132 and may receive a first set of the geographic data and/or assistance data 134 indicating locations, identities and possibly transmission characteristics of the base stations 122, 124, 126, a second set of the geographic data and/or assistance data 134 indicating positions, identities and possibly transmission characteristics of the access points 140 and 142, and a third set of the geographic data and/or assistance data 134 indicating positions of one or more geographic features, such as the point of interest 160.

The mobile device 102 may be configured to perform signal measurements to determine an absolute or a relative strength or timing (e.g., time of arrival, or round-trip-time) of signals received from one or more signal sources, such as positioning signal information 112 received from one or more of the satellites 110, signals from one or more of the base stations 122, 124, 126, and/or signals from one or more of the access points 140 and 142. In addition, the mobile device 102 may perform one or more computations to determine relative locations of one or more of the elements of the system 100 based on information regarding relative locations of the reference points 150, 152, 154, 156. To illustrate, locations of the base stations 122, 124, 126 may be provided relative to reference point B 152, while locations of the access points 140 and 142 may be provided relative to reference point D 156. The mobile device 102 may further receive reference point information indicating relative position 174 of reference point B 152 with respect to reference point A 150 and indicating relative position 176 of reference point D 156 with respect to reference point A 150. The mobile device 102 may spatially align data corresponding to the base stations 122, 124, 126 and to the access points 140 and 142 to enable information from one or more of the data sets to be used in conjunction with information from one or more others of the data sets.

Although described with respect to operations performed at the mobile device 102, in other embodiments one or more location determination operations may be performed at the location server 130. For example, the location server 130 may be configured to receive one or more signal strength and/or timing measurements from the mobile device 102 and to determine an estimate of the location of the mobile device 102 based on the measured signals. The location server 130 may be configured to spatially align one or more sets of the geographic data and/or assistance data 134 using the information corresponding to the one or more reference points 136 to combine the data to enable enhanced accuracy of location information that may be provided to the mobile device 102 via the network 120.

Other means of obtaining the geographic data and/or assistance data 134 at the mobile device 102 are also possible. For example, the mobile device 102 may obtain some data (e.g. assistance data) from the location server 130 and other data (e.g. geographic map data) from a different location server not shown in FIG. 1. The mobile device 102 may further query the network 120 or query a server (not shown in FIG. 1) designated to support such queries to obtain the address(es) of one or more such location servers. Alternatively, an indication of the data that can be obtained from a particular location server and possibly the address of this location server may be transferred to the mobile device 102 as part of assistance data from another location server. For example, assistance data 134 from the location server 130 may indicate that map data can be obtained by the mobile device 102 from another location server not shown in FIG. 1. The mobile device 102 may employ OMA SUPL or other means (e.g. HTTP, HTTPS, TCP/IP, different types of file transfer protocol) to establish a location session 132 with any such location server and obtain part of assistance data 134. The mobile device 102 may also obtain some data (e.g. just assistance data) from the network 120—for example, if the network 120 broadcasts this data. Regardless of how the data 134 is obtained and from which entity or entities, the mobile device 102 may obtain all of the data 134 and make use of common reference points to associate and combine the data as set forth elsewhere herein.

One or more reference points may be used in order to align different data layers. A reference point may be a particular point location defined in one or more data layers. A definition of a reference point may include a globally unique name or identity, location coordinates (e.g. latitude, longitude, altitude) of the reference point, any uncertainty (e.g. possible error) in this location, a civic location description of the reference point (e.g. based on street address including town, state and country or some other well known geographic designation such as airport or train station name), references to one or more maps in which the reference point appears (e.g. as a defined point on the map together with the reference point name or identifier), references to one or more servers from which maps may be obtained that include the reference point, associated points of interest (e.g. points of interest coincident with or nearby to the location of the reference point), or any combination thereof.

The unique name or identifier of a reference point may consist of a string of characters that may be defined and structured according to a globally unique identification scheme or according to an identification scheme that is unique within the context of the identifier's expected use. An example of a globally unique identification scheme may include defining globally unique reference point provider identities (IDs). A reference point defined by this provider may then be uniquely identified based on the provider's global identifier combined with another identifier assigned by the provider that is unique for the particular reference point with respect to this provider. An example of an identification scheme that is unique within the context of expected use may include an identification scheme with local (i.e. non-global) uniqueness. For example, if reference points are defined and used only within the context of data sets provided by a particular wireless operator, the wireless operator could assign any identifiers to the reference points as long as each reference point identifier differed from the other reference point identifiers assigned by the wireless operator.

When two data layers include the same reference point, the data layers may be aligned by use of the following method:

(a) Superimpose the data layers (represented as two- or three-dimensional areas or volumes) so that particular locations in both layers that have the same reference point identifier are coincident.

(b) If each data layer contains its own orientation information (e.g. up-down, north-south, east-west), rotate both layers to a common orientation. While mapping data may sometimes lack orientation information, a data layer that contains relative or absolute locations of base stations and access points may contain implicit orientation information since relative locations contain orientation information.

(c) If orientation information is missing in one or both layers (e.g. a map with no north-south-east-west information), align the data layers by aligning one or two additional common reference points. (For example, each of the additional common reference points may be aligned as described in (a)). For data sets that represent portions of the same two dimensional horizontal areas on or near the surface of the Earth, it may suffice to align two common reference points in the different data layers. For data sets that represent portions of the same volume, three common reference points may be aligned.

(d) Scale linear dimensions of each data layer (e.g. north-south, east-west, up-down) to the same scale.

Figure 2:
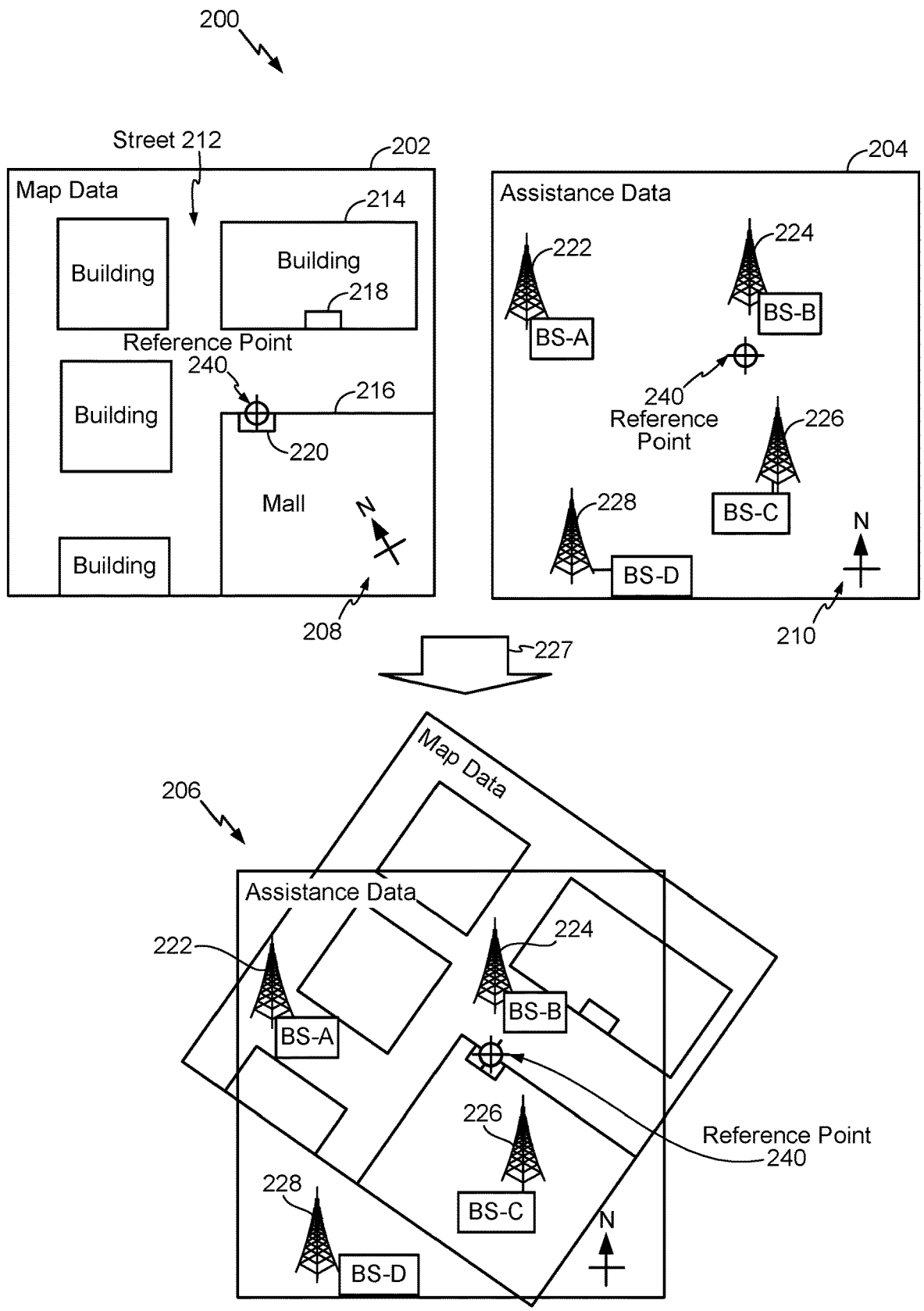
FIG. 2 is a general diagram that illustrates of alignment of multiple sets of location data using reference points.

Referring to FIG. 2, a particular embodiment of alignment of multiple sets of location data using reference points is depicted and generally designated 200. A set of map data 202 and a set of assistance data 204 are illustrated as each including a common reference point 240. The map data 202 includes data of multiple buildings and multiple streets and/or walkways, such as information indicating a representative street 212, a representative building 214 having a door 218, and a mall 216 having a main entrance 220. The map data 202 indicates a location of the reference point 240 as co-located with the center point of the main entrance 220 of the mall 216. The map data 202 further includes orientation data 208, illustrated as a compass indicating the direction of true North.

The assistance data 204 is depicted in a map-like format showing relative locations of a first base station 222, a second base station 224, a third base station 226, and a fourth base station 228 relative to the reference point 240. The assistance data 204 further includes orientation data 210, illustrated as a compass indicating the direction of true North. Although the assistance data 204 is illustrated in a map-like format for clarity, the assistance data 204 may instead be provided as a list of base station identifiers, relative locations and possibly base station transmission characteristics. Although the assistance data 204 is illustrated as including the orientation data 210, in other embodiments orientation of the assistance data 204 may be implicitly provided from relative locations of the base stations 222, 224, 226, 228.

A combining operation 227 may be performed, such as by the mobile device 102 or by the location server 130 of FIG. 1. The combining operation 227 may include one or more of rotating, translating, and scaling one or more of the map data 202 and the assistance data 204 to provide a common orientation and to align the reference point 240 in each of the data sets 202 and 204. A resulting combined data set 206 is illustrated as aligned map data 202 overlapping assistance data 204 and illustrating locations of the base stations 222, 224, 226, 228 relative to the buildings and streets of the map data 202. As illustrated, the third base station 226 is located within the mall 216 and the first base station 222 and the second base station 224 are located within open areas (e.g. streets) of the map data 202.

When two data layers are aligned, information in one layer may be transferred or correlated to the other layer. For example, base station locations may be transferred onto a map. As another example, information about building walls, doors and corridors may be transferred to a set of base station locations.

Location coordinate information may be transferred between aligned data layers. For example, locations of base stations and access points in a particular data layer may be defined relative to a reference point. If an absolute location of the reference point is provided as part of the reference point's definition or is obtained from another data layer (e.g. a map) after alignment has been performed, absolute locations of the base stations and the access points can be determined.

Although FIG. 2 shows alignment of just two data layer (or data sets) using a common reference point, alignment of more than two data layers is possible by repeating the combining operation 227 for each additional data layer. Moreover, it is only required that a reference point be common to just two of the data layers being aligned. For example, a reference point different from the reference point 240 could be used to align a third data set (not shown in FIG. 2) to either the assistance data 204 or the map data 202. Once this alignment is performed, all three data sets would be aligned (202, 204 and the new data layer). The new data layer may contain more assistance data (e.g. relative or absolute locations and transmission characteristics of other base stations and access points) or more map data (e.g. the internal layout of the mall 216) or may contain information on additional points of interest. By aligning additional data layers, more data becomes available to enable the determination of the location of a mobile device and to provide location related information (e.g. location of points of interest) to a mobile device.

If information in one data layer changes (e.g. the data layer is updated to include more accurate location information or additional map or base station data) alignment of the updated data layer with other data layers may need to be performed but can make use of the same combining operation 227 described above. To illustrate, reference point-based alignment of data layers makes use of identities of reference points rather than location related information defined for the reference points. Thus, location-related information, such as location coordinates, may be changed for a reference point and used to update location-related information for one or more data layers aligned with the updated data layer. A reference point that has a more accurate location in an updated data layer does not impede the combining operation 227 but rather provides a more precise set of combined data once alignment has been performed.

Version identification (e.g. using a version number) may be provided for each reference point as part of the reference point's definition to indicate (e.g. via incrementing of the version number) when more recent information (e.g. more recent location information) has become available for the reference point. In response to an entity or device receiving information for a more recent version of a reference point definition than any earlier received definition for the same reference point, the entity or device may replace the earlier information for the reference point with the new information. The entity or device may use the updated information to determine updated information applicable to all data layers that have been aligned using this reference point (e.g. locations of base stations, access points, and points of interest included in the aligned data layers). Although location-related information may be updated in response to updating a reference point's definition and may become more accurate and reliable, an alignment of the data layers may not be affected. For example, if the definition of the reference point 240 in FIG. 2 is updated with a more accurate absolute latitude, longitude and altitude for the location of the reference point 240, the alignment of data layers 206 in FIG. 2 that indicates that the base station 226 is located at a certain point in the mall 216 may not be affected if the assistance data 204 specifies the location of the base station 226 relative to the reference point 240 and the map data 202 specifies the location of the reference point 240 in association with the mall 216 (i.e. in this case at the center of the main entrance 220). However, the absolute location (latitude, longitude, altitude) of the base station 226 would be changed by the update to the absolute location of the reference point 240 which would then change the location of the base station 226 relative to other entities that were not included in the aligned data 206 (e.g. base stations inside or outside the areas covered by 206) whose locations were not defined relative to the reference point 240. This could in turn change, and improve, positioning of a mobile device that measured signals from both the base station 226 and other base stations not part of the combined data set 206, thereby making the update to the definition of the reference point 240 useful for positioning.

Reference points (possibly together with a version indication) may also be used by a mobile device to request one or more assistance data layers from a server. The request for assistance data may include one or more reference points for which the device already has associated assistance data stored, or the device may specifically request assistance data for a particular reference point and/or reference point version. For example, the device may have access point location data for a particular reference point stored (e.g., received via a previous assistance data delivery), but may not have associated mapping data stored either for an application or for assisting the position location process. The device may then include one or more reference points currently stored by the device (including their versions) in an assistance data request message sent to a location server. The location server may then provide the map data (or other requested data) for the reference point version stored or requested by the device. If the server already has an updated version of the data available (e.g. for a higher reference point version), the server may translate the requested assistance data to an earlier reference point version as requested by the device and/or may inform the device that for this reference point updated data is already available. In the latter case, the server may decide to push the updated data for this reference point together with the device requested assistance data to the device. A mobile device may therefore be able to request only a needed or updated layer of assistance data, and still be able to use various stored assistance data layers together with newly desired or required information (e.g., new points-of-interest map data for an already stored map of a shopping mall).

Reference points may also be used to provide or define location information such as a location estimate for a mobile device. A location estimate may be provided as a location relative to a particular reference point instead of, or in addition to, being provided as an absolute geographic or civic location. Providing a location estimate relative to a particular reference point enables a recipient of the location estimate to correlate the location estimate with other data that the recipient may have that also contains the particular reference point. For example, the recipient may be able to locate the location estimate on a map that does not contain absolute geographic or civic location information but does indicate the position of the reference point. It is possible that a location estimate may be computed and expressed only relative to a reference point without ever being transformed into an absolute geographic or civic form. Maintaining a location estimate as a location relative to a reference point may be useful to providing and managing location information in environments where locations are accurately known relative to one another but where absolute location is either unknown or known imprecisely, such as inside a building, or is simply not needed. For example, it may be rare to make use of absolute locations in a local area context but common to use relative locations and relative geographic directions.

A relationship between pairs of reference points may also be provided to a mobile device by a location server when assistance data is provided using two or more reference points. The relationship may define the relative location of one reference point in a pair relative to the location of the other reference point. This may be useful when several assistance data layers are provided with each assistance data layer having its own reference point or reference points that are not the same as the reference points provided for other assistance data layers. For example, an assistance data layer may be provided containing map information for the inside of a particular building and may contain a reference point A that is defined relative to the building—e.g. the front door of the building or a particular named location inside the building. Another assistance data layer may be provided containing information for base stations and Wi-Fi access points (APs) inside the building and may again employ the same reference point A. A further assistance data layer may be provided containing map information for a larger geographic area that includes the building (e.g. an area comprising several blocks of a town or city). This assistance data layer may reference or contain some other reference point B that is outside the building. Yet another assistance data layer may be provided containing information for base stations and Wi-Fi APs outside the building and may again make use of the reference point B (e.g. to define the locations of the provided base stations). It is possible that a mobile device inside the building will be able to make use of signals received from base stations and even Wi-Fi APs outside the building to help obtain its location. In order to transfer information between the provided assistance data layers (four layers in this example), it may be necessary to know the location of reference point A relative to reference point B. This will then allow the locations of base stations outside the building to be determined relative to the reference point A and hence relative to Wi-Fi APs and base stations inside the building. It will also allow the reverse, namely to determine the locations of Wi-Fi APs and base stations inside the building relative to the reference point B and hence relative to base stations and Wi-Fi APs outside the building. The ability to precisely relate information contained in all the assistance data layers will permit location inside and outside the building to make use of base stations and Wi-Fi APs both inside and outside the building. It will also permit map assistance of location (e.g. prediction of RF signal strengths based on structures outside the building as well as features inside the building) to make use of both maps of areas external to the building as well as maps of the inside of the building.

Figure 3:
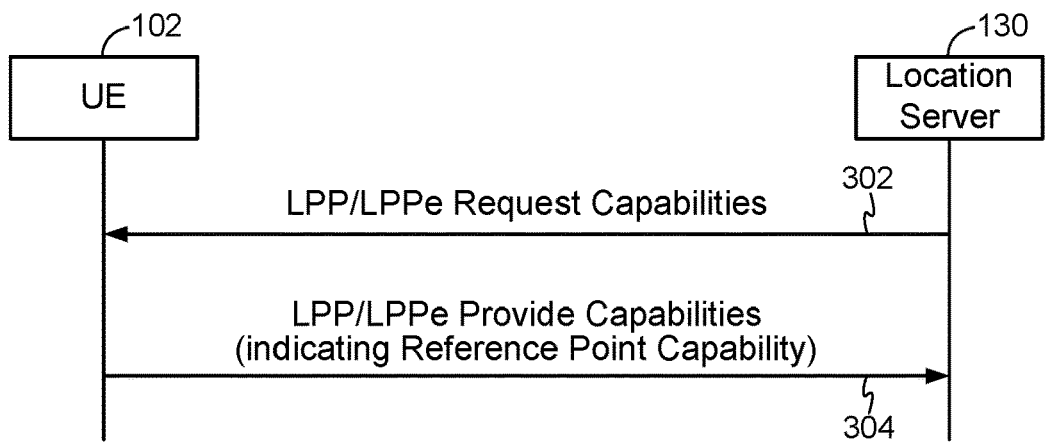
FIG. 3 is a diagram of a particular embodiment of Long Term Evolution (LTE) Positioning Protocol (LPP)/LPP Extensions (LPPe) messaging including reference point capability information.

Referring to FIG. 3, a diagram of long term evolution (LTE) positioning protocol (LPP)/LPP extensions (LPPe) messaging including reference point capability information is depicted. The location server 130 of FIG. 1 may send an LPP/LPPe request capabilities message 302 to the mobile device 102 of FIG. 1 (also referred to as user equipment (UE)). In response to the request capabilities message 302, the UE 102 may send an LPP/LPPe provide capabilities message 304. The provide capabilities message 304 may indicate a reference point capability of the UE 102. For example, the provide capabilities message 304 may include one or more information elements (IEs) in accordance with the OMA LPPe specification. For example, the provide capabilities message 304 may include one or more IEs such as those shown in Table 1.

TABLE 1

Possible IEs within an LPPe Provide Capabilities message 304 applicable to support of Reference Points by a Mobile Device

| LPPe Provide Capabilities IE | Explanation |
| --- | --- |
| relativeLocationReportingSupport | This IE indicates whether the UE supports location reporting relative to a reference point, what type of reference point location is supported (geographic, or civic) and whether the UE is able to support location reporting relative to reference point providers not listed in the referencePointProviderSupportList IE. |
| referencePointProviderSupportList | This IE provides a list of reference point provider IDs that the UE supports for location reporting and associated attributes for each provider (mapDataSupport IE) that the target supports within reference point assistance data for these provider IDs. |
| mapDataSupport | This IE, if present, indicates whether the UE supports map data information for a particular reference point provider and may include additional information specific to the provider in mapDataFormat about the |

TABLE 1-continued

Possible IEs within an LPPe Provide Capabilities message 304
applicable to support of Reference Points by a Mobile Device

| LPPe Provide Capabilities IE | Explanation |
| --- | --- |
| mapDataFormat | supported map data format(s). If this IE is absent, no map data information may be supported by the UE for this reference point provider. This IE may be an octet string that provides information specific to a particular reference point provider concerning the type of map data supported by the UE (e.g. the format of the map data). |

Figure 4:
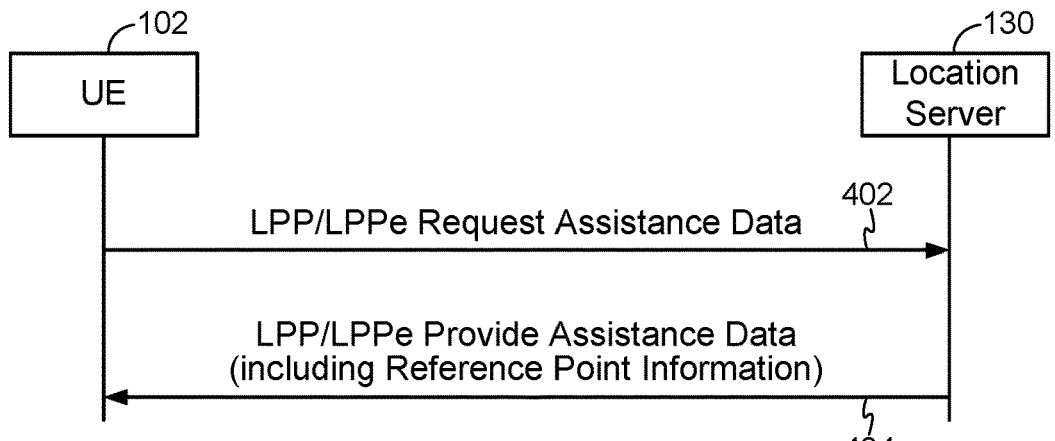
FIG. 4 is a diagram of a particular embodiment of LPP/LPPe messaging including assistance data with reference point information.

Referring to FIG. 4, a diagram of LPP/LPPe messaging including assistance data with reference point information is depicted. The UE 102 may send an LPP/LPPe request assistance data message 402 to the location server 130. In response to the request assistance data message 402, the location server 130 may send an LPP/LPPe provide assistance data message 404. The request assistance data message 402 may include a reference point request. For example, the request assistance data message 402 may include one or more IEs in accordance with an OMA LPPe specification, such as those shown in Table 2.

TABLE 2

Possible IEs within an LPPe Request Assistance Data message 402
applicable to use of Reference Points by a Mobile Device

| LPPe Request Assistance Data IE | Explanation |
| --- | --- |
| referencePointAssistanceReq | This IE may be used by a UE to specify the UE preference for particular types of reference point in any subsequent assistance data sent by the server that includes one or more reference points. This IE may contain a referencePointReq IE |
| referencePointReq | This IE may provide a list of reference point types preferred by the UE, listed in the order of preference. The first reference point type in the list may be the most preferred type, etc. For each reference point type, a referencePointProvider IE and a mapDataReq IE may be provided. |
| referencePointProvider | This IE may indicate the preferred reference point provider ID |
| mapDataReq | This IE may indicate that map data (e.g. a data layer or data set containing map data) is requested by the UE for any reference point provided by the server to the UE for the indicated reference point provider. The content of this IE may be specific to the reference point provider and may indicate additional information on the map format or data that is requested by the UE. |

The provide assistance data message 404 may include reference point information. For example, the provide assistance data message 404 may include one or more IEs in accordance with an OMA LPPe specification, such as those shown in Table 3.

TABLE 3

Possible IEs within an LPPe Provide Assistance Data message 404
applicable to use of Reference Points by a Mobile Device

| LPPe Provide Assistance Data IE | Explanation |
| --- | --- |
| assistanceContainer | This IE may provide map data associated with a particular reference point provider and/or containing one or more reference points |
| default-reference-point | This IE may include a default reference point applicable to other assistance data (e.g. relative locations of base stations and/or Wi-Fi access points) in the LPPe Provide Assistance Data message for which a reference point is associated. The default reference point can also be provided to support relative location reporting by the UE to the location server relative to a reference point. |
| Other assistance data IEs | Other IEs may be included that provide the locations of base stations, Wi-Fi access points or other entities relative to reference points. The reference points used may be among those indicated as preferred by the UE in an LPPe Request Assistance Data message 402. |

A reference point (such as a default reference point or another reference point indicated in the provide assistance data message 404) may be designated via one or more IEs in accordance with an OMA LPPe specification, such as those shown in Table 4.

TABLE 4

Possible IEs provided by a server for a Reference Point that is provided to a
Mobile Device

| Reference Point associated IE | Explanation |
| --- | --- |
| referencePointUniqueID | This IE may provide a unique ID for the reference point and a version number, which allows the reference point to be referred to in other messages and different parts of the |

TABLE 4-continued

Possible IEs provided by a server for a Reference Point that is provided to a Mobile Device

| Reference Point associated IE | Explanation |
|---|---|
| | same message without repeating the complete definition (e.g. as set forth in this table). This may also allow a UE and a location server to reliably indicate the same reference point (e.g. when several reference points have almost the same location but different unique IDs). A possible definition of the referencePointUniqueID IE is shown in Table 5. |
| referencePointGeographicLocation | This IE may provide the geographic location of the reference point (e.g. latitude, longitude and altitude and optionally the uncertainty in these). Either the referencePointGeographicLocation IE or the referencePointCivicLocation IE or both IEs may be present unless either the referencePointUniqueID IE or the relatedReferencePoints IE is present and can be used to determine location (e.g. using a separate definition provided or available for the referencePointUniqueID IE or by making use of information provided for another reference point in the relatedReferencePoints IE). |
| referencePointCivicLocation | This IE may provide a civic location information description of the reference point. Either the referencePointGeographicLocation IE or the referencePointCivicLocation IE or both IEs may be present unless either the referencePointUniqueID IE or the relatedReferencePoints IE is present and can be used to determine location (e.g. using a separate definition provided or available for the referencePointUniqueID IE or by making use of information provided for another reference point in the relatedReferencePoints IE). |
| referencePointFloorLevel | This IE may provide the floor level or basement level of a reference point that is inside a building or other man made structure (e.g. parking garage) that has well defined floor levels. A value of zero may correspond to ground level, positive values are above ground level and negative values below ground level. This information may duplicate part of the referencePointCivicLocation IE (if this is provided) for the benefit of a recipient unable to decode the latter. |
| relatedReferencePoints | This IE may provide a list of other reference points that are related to the reference point being defined. For each related reference point, the unique ID may be provided and the relative location of this reference point with respect to the location of the reference point being defined. Related reference points may be used to relate different sets of assistance data from the location server that are each provided in association with a distinct reference point or points. |
| mapDataInformation | This IE may provide a map reference for the reference point. The map reference can include one or more MapDataReferenceElement IEs. |
| MapDataReferenceElement | This IE may provide information about map data that is available for the reference point being defined - e.g. map data that include the reference point such a map of a building that shows the location of the reference point at a certain point on the map. This IE may contain the following IEs defined below in this table: mapDataUrl, mapProvider, mapAssociation, mapHorizontalOrientation. |

TABLE 4-continued

Possible IEs provided by a server for a Reference Point that is provided to a Mobile Device

| Reference Point associated IE | Explanation |
|---|---|
| mapDataUrl | This IE may be formatted in accordance with Internet Engineering Task Force (IETF) Request for Comments (RFC) 3986 and may provide a reference to map data information. The map data information could be an image or dataset that represents a map, floor plan, layout of a building or buildings, layout of a town or city, or any other form of representation/data understood by both the sender and recipient. Map data may be 2D or 3D. Alternatively, this IE may provide a map reference specific to a particular map provider that may be used to obtain the map directly from the same server that is providing the reference point definition defined in this table. In this case, the map data may be provided in the assistanceContainer IE described for an LPPe Provide Assistance Data message 404 in Table 3. |
| mapProvider | This IE may identify the map provider which may be either the same as the provider of the reference point being defined or not the same. This IE may be optional. If absent, the map provider may not be explicitly identified - e.g. but may be provided as part of the map data itself or may be inferred from the mapDataUrl IE. |
| mapAssociation | This IE may provide an exact association between the reference point being defined and a particular location on the map (i.e. identifies how the location of the reference point is defined on the map). The choices may be provided by any of the following IEs:<br>referencePointUniqueID: a location identified by the referencePointUniqueID IE is defined within the map. The conventions for such identification may be specific to the map provider; or<br>otherID: a location corresponding to a visible character string provided for the otherID IE is defined within the map. The conventions for such identification may be specific to the map provider; or<br>mapOffset: the relative location is provided of the origin of the map coordinate system relative to the reference point (or vice versa); or<br>origin: the reference point location coincides with the map origin. |
| mapHorizontalOrientation | This IE may specify the orientation (e.g. in degrees clockwise from North) of the map coordinate system with respect to North. If this IE is absent, the North direction at the reference point may coincide with the North direction of the map coordinate system. |

A reference point may be identified according to a unique identifier that includes the identity of a reference point provider, an identifier assigned by this provider, a version number, one or more other factors, or any combination thereof. For example, a reference point may be identified via one or more IEs in accordance with an OMA LPPe specification, such as those shown in Table 5.

TABLE 5

Possible IEs within an a Reference Point Unique Identifier

| LPPe Reference Point Unique ID IE | Explanation |
|---|---|
| providerID | This IE may identify the vendor or operator or other service provider with jurisdiction over the reference point. The providerID may contain a unique ID reserved for the provider or some ID associated with (e.g. containing) the name of the provider. |
| providerAssignedID | This IE may provide a unique ID relative to (e.g. assigned by) the particular provider. |
| Version | This field may provide the version of the reference point. The initial version of any reference point may be indicated by the number one. In case data associated with a given reference point is updated, the version may be incremented by one. A UE may delete all data associated with any previous version of a particular reference point when receiving data associated with a more recent version. For reference points without a unique ID, versioning may not be applicable and the reference point may not be uniquely referred to in any context where it is not completely defined. |

Location information (e.g. the location of a base station, a reference point or a mobile device) may be provided as geographic location data or civic location data. For example, civic location data may be provided via one or more IEs in accordance with an OMA LPPe specification, such as those shown in Table 6.

TABLE 6

Possible IEs for Civic Location Information

| Civic Location Information IE | Explanation |
|---|---|
| countryCode | This IE may provide the two-letter International Organization for Standardization (ISO) 3166 country code in capital American Standard Code for Information Interchange (ASCII) letters, e.g., DE or US |
| civicAddressElementList | This IE may provide a sequence of one or more CivicAddressElement IEs |
| CivicAddressElement | This IE may provide a particular component of the civic address (e.g. a street name or city name) and may contain a caType IE and a caValue IE |
| caType | This IE may define the civic address type using an integer in the range zero to 511. Values 0 to 255 may be as defined in IETF RFC 4776, and values greater than 255 may be OMA defined civic address types - e.g. using 256 to indicate an airport terminal, 257 to indicate an airport concourse and 259 to indicate an airport gate. |

TABLE 6-continued

Possible IEs for Civic Location Information

| Civic Location Information IE | Explanation |
|---|---|
| caValue | This IE may specify the civic address value, as decribed in IETF RFC 4776. As defined in IETF RFC 4776, this may be encoded as Universal Character Set (UCS) Transformation Format - 8-bit (UTF-8) and may employ mixed case. |

As a specific example of providing assistance data including reference point information, the location server 130 may provide access point (AP) assistance data, such as for the WLAN access points 140 and 142 of FIG. 1. For example, WLAN AP assistance data may be provided in an LPPe Provide Assistance Data message 404 via a data set containing one or more IEs in accordance with an OMA LPPe specification, such as those shown in Table 7.

TABLE 7

Possible IEs for LPPe WLAN assistance data

| LPPe WLAN AP Assistance Data IE | Explanation |
|---|---|
| oma-lppe-WLAN-DataSet | This IE may provide assistance data for one or more sets of WLAN APs. For each set of WLAN APs a OMA-LPPe-WLAN-DataSet IE may be provided containing one or more of the following IEs described below in this table: plmn-Identity, reference-point, supported-channels-11a, supported-channels-11bg, wlan-ap-list. |
| plmn-Identity | This IE may identify a network operator who manages the WLAN APs via any wide area network owned by the operator and accessible from each of the WLAN APs. The operator may be identified by a country code and a network code - e.g. as specified in 3GPP TS 23.003 or ITU E.212. |
| reference-point | This IE may provide a full definition of a reference point - e.g. as given in Table 4. The presence of the "reference-point" IE may be conditional. The IE may be present when one or more WLAN AP locations are provided for the WLAN AP assistance data and a default reference point is not provided in an LPPe Provide Assistance Data message (e.g. as described in Table 3). |
| supported-channels-11a | This IE may describe the superset of all channels supported by all WLAN APs in the data set of type 801.11a. |
| supported-channels-11bg | This IE may describe the superset of all channels supported by all WLAN APs in the data set of type 801.11b or 802.11g. |
| wlan-ap-list | This IE may provide information for each WLAN AP in the set of WLAN APs referred to by the OMA-LPPe-WLAN-DataSet IE. For each WLAN AP, this IE may contain one or more of the following IEs described below in this table: wlan-ap-id, relative-location, location-reliability, wlan-ap-Type-Data. |
| wlan-ap-id | This IE may provide the identity of the WLAN AP - e.g. its 48 bit MAC address. |
| relative-location | This IE may provide the location and optional uncertainty in location of the WLAN AP relative to the reference point that was identified for this data set (as defined either by the reference-point IE if present or by the default-reference-point IE in Table 3). This field may be provided if requested and available. |

TABLE 7-continued

Possible IEs for LPPe WLAN assistance data

| LPPe WLAN AP Assistance Data IE | Explanation |
|---|---|
| location-reliability | The IE may provide the reliability R of the WLAN AP location where R is or can be converted to a numeric value between zero and one. The probability that the WLAN AP location has not changed may then be given by R. R may be based on both historic change or persistence of the AP location over a period of time and the time interval since the AP location was last provided to or verified by the server. Location reliability may be distinct from location accuracy and may refer to the possibility of a WLAN AP having been moved to a new location. This field may be provided if requested and available. This IE can be used by a mobile device to determine whether the WLAN AP location may have changed from the WLAN AP location provided by the server. |
| wlan-ap-Type-Data | This IE may provide information for one or more WLAN AP types (e.g. for a multi-band and/or multimode device) sharing a common physical AP implementation, This IE may contain the following IEs described further down in this table: oma-LPPe-WLAN-AP-Type, transmit-power, antenna-gain. |
| oma-LPPe-WLAN-AP-Type | This IE may provide the type of the WLAN AP - e.g. whether the WLAN supports the IEEE 802.11a, 802.11b, 802.11g or 802.11n specification. |
| transmit-power | This IE may specify the transmit power of the WLAN AP - e.g. for beacon frames in dBm. This IE may be provided if requested and available. |
| antenna-gain | This IE may specify the antenna gain of the WLAN AP in dBi. This IE may be provided if requested and available. |

Although Table 7 shows information related to reference points in a Provide Assistance Data message 404 applicable to WLAN APs, it may be appreciated by those skilled in the art, that similar information related to reference points may be provided (e.g. in a Provide Assistance Data message 404 or some other message) for base stations or other terrestrial based transmitting devices (e.g. TV and radio transmitters, Bluetooth devices, Femtocells). Such similar information may contain the definition or identification of a reference point, the locations of the transmitting devices relative to this reference point as well as characteristics (e.g. antenna and transmission characteristics) of these transmission devices.

In Table 7, the "relative-location" IE may provide the location and optional uncertainty in location of a WLAN AP relative to a reference point—e.g. the reference point defined by the "reference-point" IE in Table 7. Relative location may also be used to provide the location of a base station, a mobile device, a point of interest or some other element or entity relative to the location of another element or entity that may, but need not necessarily be, a reference point in a similar manner. In a particular embodiment, a common definition may be employed for any relative location such as the definition used in the OMA LPPe protocol which has the ASN.1 data type name OMA-LPPe-RelativeLocation IE. This common definition may provide a location, that may be referred to as the subject location, relative to another location that may be referred to as the reference location. The reference location may or may not be fixed and may or may not be known or capable of being determined in absolute terms (e.g. in terms of its latitude, longitude, altitude and possible the uncertainty in each of these). An unknown reference location could be applicable and useful when the location of one mobile device is needed relative to the location of another mobile device—e.g. when the associated users are only interested in knowing where they are relative to one another. A common definition of relative location, such as in this embodiment, can be used to define any of the following:

(a) a fixed location (e.g. of a base station or Wi-Fi AP) relative to some other known fixed location (e.g. a fixed location associated with a reference point or a fixed point of interest);

(b) a temporary location (e.g. of a mobile device) relative to a known fixed location (e.g. of a reference point) or a known temporary location (e.g. of another mobile device); or (c) the change in location of a mobile device in moving from an initial known or unknown reference location to a new subject location.

A common definition of a relative location according to the embodiment in the OMA LPPe specification may include the IEs shown in Table 8.

TABLE 8

Possible IEs for Relative Location Information

| Relative Location Information IE | Explanation |
|---|---|
| relativeNorth | This IE may provide either (i) the difference in the latitude coordinates of the reference and subject locations as measured in degrees or arc seconds or (ii) the distance (e.g. in meters) along any line of longitude over the surface of the Earth (e.g. as represented by the World Geodetic System 84 (WGS 84) ellipsoid) between the reference and subject latitude circles. A positive value may be used to indicate the subject location is north of the reference location. |
| relativeEast | This IE may provide either (i) the difference in the longitude coordinates of the reference and subject locations as measured in degrees or arc seconds or (ii) the distance (e.g. in meters) along the line of latitude for the reference location over the surface of Earth (e.g. as represented by the WGS 84 ellipsoid) between the reference and subject longitude circles. A positive value may be used to indicate the subject is east of the reference. |
| units | This IE may specify the units (e.g. meters, centimeters) for the relativeEast and relativeNorth IEs when expressed as distances. |
| arc-second-units | This IE may specify the units (e.g. degrees, arc seconds) for the relativeEast and relativeNorth IEs when expressed as differences between latitude or longitude coordinates. |
| relativeAltitude | This IE may provide the difference in the altitude of the reference and subject locations in geodetic terms (e.g. in meters) and/or in civic terms (e.g. in terms of the number of floors in a building). The uncertainty (e.g. in terms of meters for geodetic altitude or floors for civic altitude) in the difference may also be provided as well as the level of confidence (e.g. probability between zero and one) that the actual difference in altitude is less than or equal to this uncertainty. |

TABLE 8-continued

Possible IEs for Relative Location Information

| Relative Location Information IE | Explanation |
|---|---|
| horizontalUncertainty | This IE may provide the uncertainty in the horizontal component of the relative location and may be expressed either as a circle with given radius or as an ellipse with given semi major axis, semi minor axis and offset angle (e.g. 0-179 degrees) subtended clockwise from North to the semi major axis. The center of the circle or ellipse may be given by a location with the provided relative location to the reference location and the area enclosed may define possible values of the actual subject location. The encoded value N for the length L of the radius of the circle or the semi major axis or semi minor axis of the ellipse may satisfy the following equations: $L = 5 * (1.1^N - 1)$ units (range is 0-903314 units for N in the range 0-127) e.g. for 1 meter units, (N = 1, L = 0.5 m), (N = 2, L = 1.05 m), (N = 10, L = 8.0 m), (N = 20, L = 28.6 m), (N = 40, L = 221 m), (N = 60, L = 1517 m) |
| horizontalConfidence | This IE may provide the confidence (e.g. 0-100%) that the actual subject location lies within the circle or ellipse defined by the horizontalUncertainty IE. The default value if confidence is absent may be 68% and a confidence value of 0% may mean confidence is unknown. The confidence value may be provided if available. |

Although FIG. 4 illustrates the provide assistance data message 404 being provided in response to the location server 130 receiving the request assistance data message 402, in other embodiments the location server 130 may send the provide assistance data message 404 without receiving a request from the UE 102 (i.e. the location server 130 provides unsolicited assistance data to the UE 102).

Figure 5:
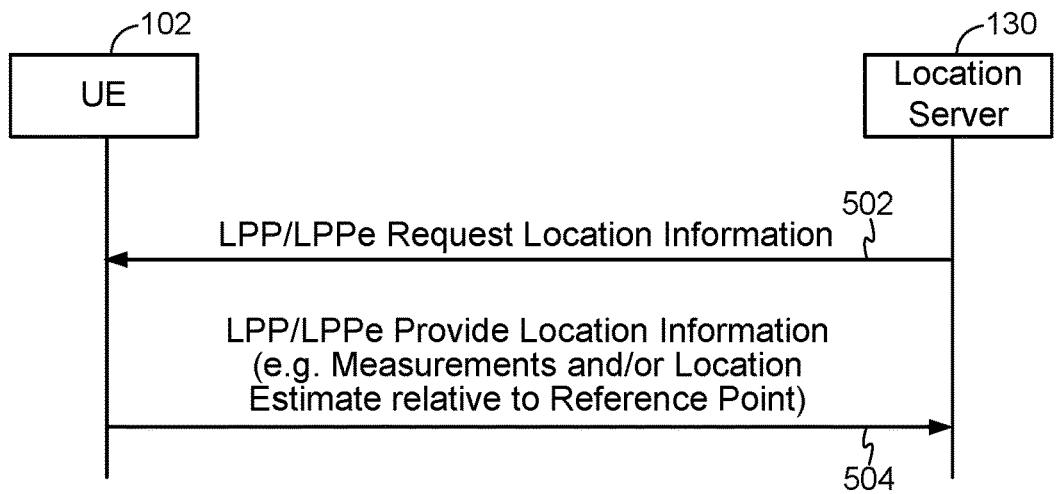
FIG. 5 is a diagram of a particular embodiment of LPP/LPPe messaging including location information relative to a reference point.

Referring to FIG. 5, a diagram of LPP/LPPe messaging including location information relative to a reference point is depicted. The location server 130 may send an LPP/LPPe request location information message 502 to the UE 102. In response to the request information location message 502, the UE 102 may send an LPP/LPPe provide location information message 504. The request location information message 502 may include a reference point request. For example, the request location information message 502 may include one or more IEs in accordance with an OMA LPPe specification, such as those shown in Table 9.

TABLE 9

Possible IEs within an LPPe Request Location Information message 502 applicable to use of Reference Points by a Mobile Device

| LPPe Request Location Information IE | Explanation |
|---|---|
| localPositionRequest | This IE may be included by the server to request or permit the UE to report its location relative to a reference point. This request may only apply when the UE has information on one or more reference points (e.g. received from the server) and is reporting a location estimate (e.g. for the UE) and may be ignored by the UE when the UE has no information on reference points or reports location measurements but not a location estimate. This IE may contain a typeOfRequest IE and optionally a referencePointReq IE which are described below in this table. |
| typeOfRequest | This IE may indicate whether reporting of a local (relative) location is (i) an optional addition to reporting of absolute location, (ii) a mandatory addition to reporting of absolute location, or (iii) a mandatory alternative to absolute location (meaning a relative location must be reported and an absolute location must not be reported). |
| referencePointReq | This IE may specify a list of desired reference points relative to which the subject location (e.g. of the UE) is requested in the order of preference. Each of the reference points in the list may be specified using a unique ID - e.g. as described in Table 5. The first reference point in the list may be the most preferred reference point, etc. Details (e.g. complete definitions as in Table 4) of the reference points in the list may have been provided to the UE in previous assistance data from the server. If no reference points are specified (e.g. if the list is empty or the referencePointReq IE is not provided), the UE may report its location relative to any available reference point. |

The provide location information message 504 may include location measurements obtained by UE 102 and/or a location estimate for UE 102 obtained by UE 102 relative to a reference point (e.g. one of the reference points provided by the location server 130 in the referencePointReq IE in the Request Location Information message 502). For example, the provide location information message 504 may include one or more IEs in accordance with an OMA LPPe specification, such as those shown in Table 10.

TABLE 10

Possible IEs within an LPPe Provide Location Information message 504 applicable to use of Reference Points by a Mobile Device

| LPPe Provide Location Information IE | Explanation |
|---|---|
| localPosition | This IE may provide a subject location (e.g. for the UE 102) in a local coordinate system, whose origin is defined by a reference point. This IE may be included when a UE provides a location estimate (e.g. may not be provided when a UE provides location measurements). The IE may be provided in addition to or instead of an absolute location estimate (e.g. defined by latitude and longitude or by a civic location). This IE may contain a referencePoint IE and optionally a subjectLocation IE which are described below in this table. |
| referencePoint | This IE may specify the reference point relative to which the subject location (e.g. of the UE) is defined. The reference point may be specified using a unique ID - e.g. as given in Table 5. |
| subjectLocation | This IE may indicate the subject location (e.g. of the UE) relative to the reference point specified by the referencePoint IE using a relative location (e.g. the relative |

TABLE 10-continued

Possible IEs within an LPPe Provide Location Information message 504 applicable to use of Reference Points by a Mobile Device

| LPPe Provide Location Information IE | Explanation |
|---|---|
| | location defined in Table 8). If this IE is absent, the subject location may coincide with the reference point location. |

In some embodiments, the request location information message 502 may identify measurements that the UE 102 should make, such as by indicating specific measurements for each base station and/or access point in a list of base stations and/or access points. The provide location information message 504 may include an indication of one or more such measurements made by the UE 102. The location server 130 may use the received measurements to estimate a location of the UE 102. In some embodiments, the location server 130 may combine multiple data sets using common reference points, such as described with respect to FIG. 2. For example, the location server may combine (A) a first data set that contains the locations (e.g. defined relative to one or more reference points) and transmission characteristics of a set of base stations and/or access points with (B) a second data set that contains (i) locations measurements for these base stations and/or access points made by the UE 102 and/or (ii) relative locations determined by UE 102 relative to one or more of the reference points in the first data set and with (C) a third data set that contains map data including one or more of the reference points in the first and second data sets. The first, second and third data sets may be combined by the location server 130 as described with respect to FIG. 2. In another embodiment, these same data sets may be combined by the UE 102 according to FIG. 2 to help enable the UE 102 to determine its own location or to determine other location aspects of interest, such as the location of a nearby point of interest relative to the location of UE 102.

In other embodiments, the UE 102 may generate a location estimate relative to a reference point and provide the relative location estimate to the location server 130 via the provide location information message 504. In some embodiments, the UE 102 may combine multiple data sets using common reference points, such as described with respect to FIG. 2.

Although FIG. 5 illustrates the provide location information message 504 being provided in response to the UE 102 receiving the request location information message 502, in other embodiments the UE 102 may send the provide location information message 504 without receiving a request from the location server 130 (i.e. the UE 102 provides unsolicited location information to the location server 130).

Figure 6:
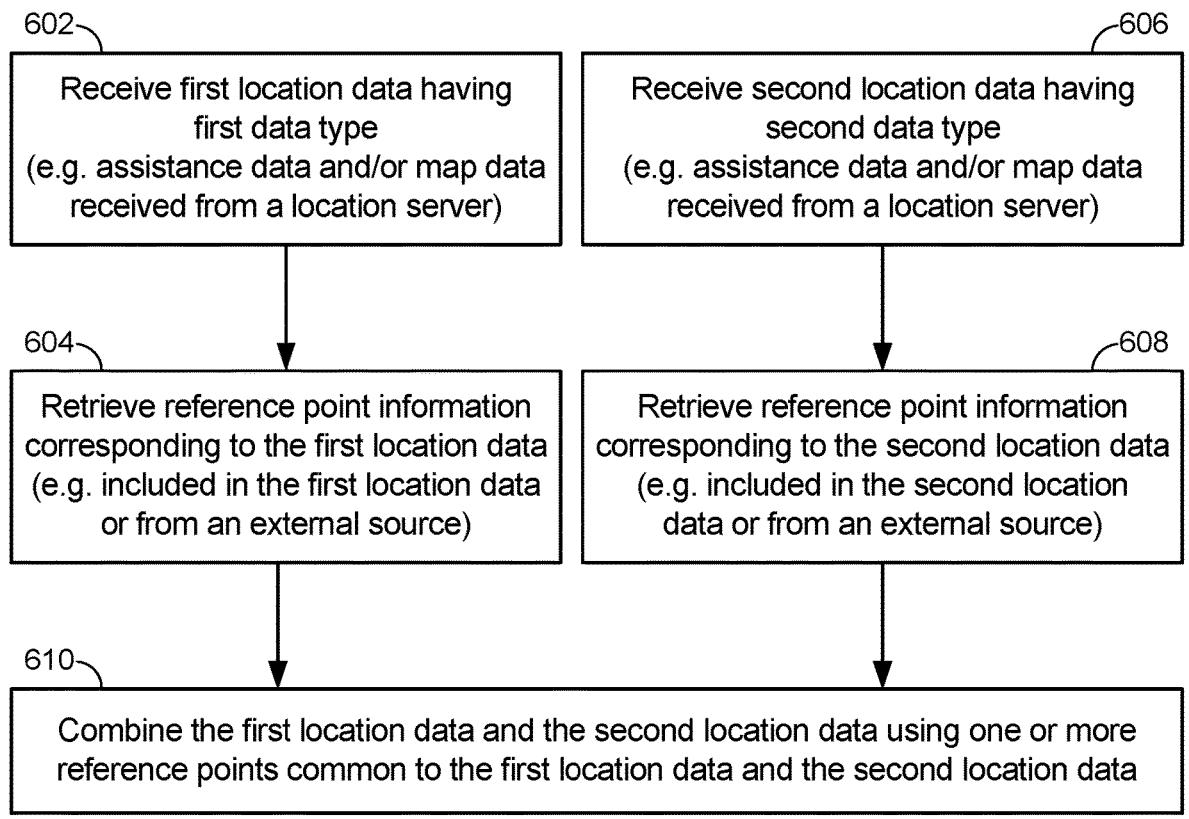
FIG. 6 is a flow chart of a particular embodiment of a method of using reference points to combine multiple data types.

Referring to FIG. 6, an embodiment of a method of combining location data is depicted. The method may be performed by a mobile device, such as the mobile device 102 of FIG. 1. First location data is received having a first data type, at 602. For example, the first location data may include assistance data and/or map data received from a location server—e.g. data as described in Table 3 or Table 7. Reference point information corresponding to the first location data may be retrieved, at 604. For example, the reference point information may be included in the first location data and retrieved from the first location data. As another example, reference point information may be retrieved from an external source, such as from a location server. The reference point information may be as described in Table 4.

Second location data having a second data type is received, at 606. For example, the second location data may be assistance data and/or map data—e.g. data as described in Table 3 or Table 7. The second location data may be received from a location server, such as the location server 130 of FIG. 1. Reference point information may be retrieved corresponding to the second location data, at 608. For example, reference point information may be included in the second location data and retrieved from the received second location data. As another example, reference point information may be retrieved from an external source, such as the location server 130 or another provider of reference point information. The reference point information may be as described in Table 4.

The first location data and the second location data are combined using one or more reference points common to the first location data and the second location data, at 610. For example, when the first location data and the second location data include a common reference point, the first location data and the second location data may be spatially aligned and superimposed, such as illustrated with respect to FIG. 2. As another example, when the first location data includes locations relative to a first reference point and the second location data includes locations relative to a second reference point, the first location data and the second location data may be determined based on a relative location of the first reference point to the second reference point. For example, the reference point B 152 of FIG. 1 may provide a common reference point for relative locations of the base stations 122, 124, 126 and the reference point D 156 may provide a reference point for the relative locations of the access points 140 and 142. The relative position 178 of the reference point B 152 relative to the reference point D 156 may be used to align first assistance data including the base station information 122, 124, 126 with second assistance information including the access point information 140 and 142.

Figure 7:
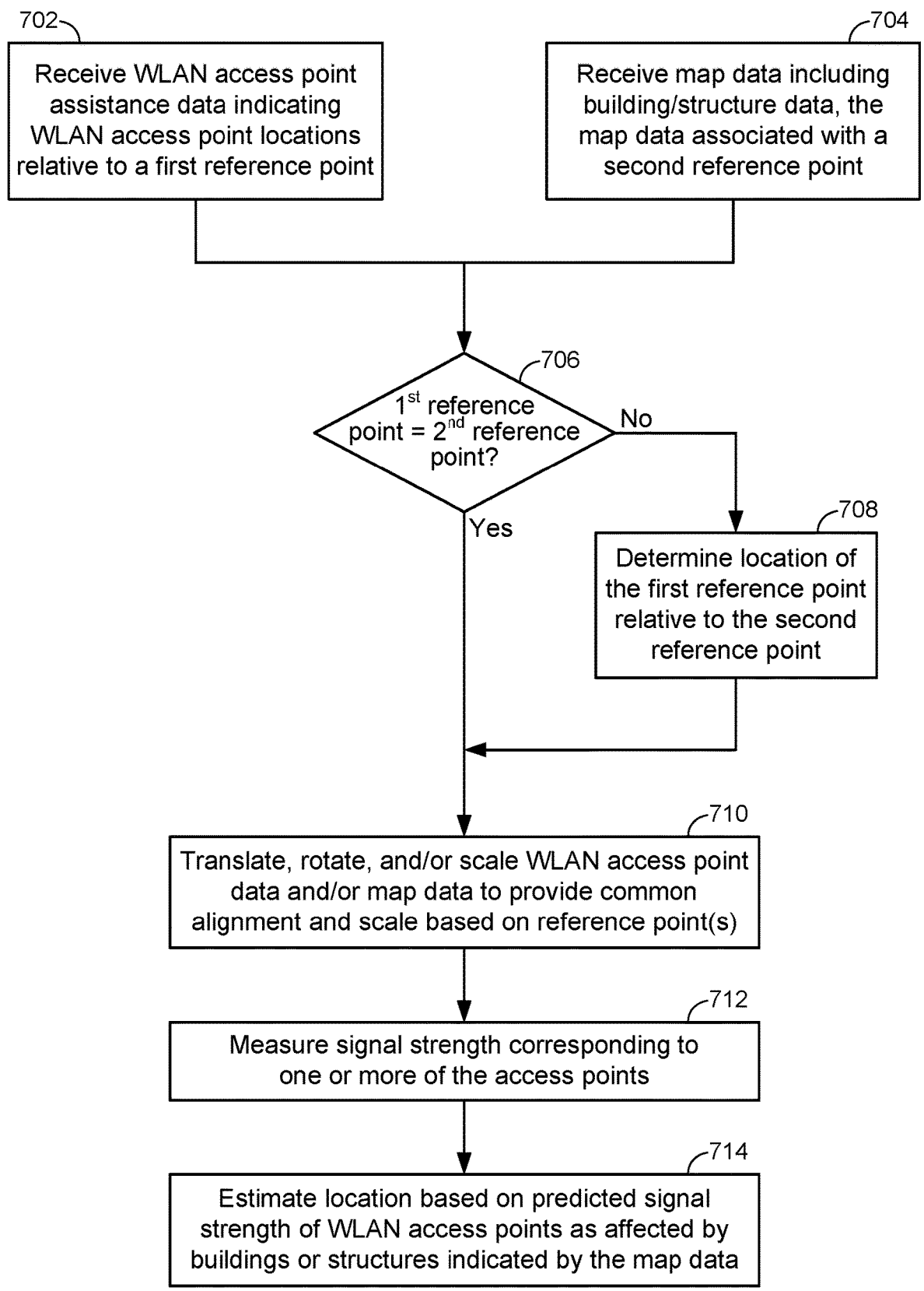
FIG. 7 is a flow chart of a particular embodiment of a method of using reference points to combine wireless local area network (WLAN) access points with map data.

Referring to FIG. 7, a particular embodiment of a method of combining access point assistance data and map data is depicted. WLAN access point assistance data indicating WLAN access point locations relative to a first reference point is received, at 702. For example, the mobile device 102 of FIG. 1 may receive the geographic data and/or assistance data 134 including information regarding the access points 140 and 142 relative to a first reference point, such as the reference point D 156. The WLAN access point assistance data received at 702 may be as described in Table 7.

Map data including building/structure data is received, at 704. The map data is associated with a second reference point. For example, the map data may be received via the geographic data and/or assistance data 134 and may include geographic information such as the point of interest 160. The map data may be associated with the reference point A 150 of FIG. 1. The map data received at 704 may be received in an LPPe Provide Assistance Data message 404 in the assistanceContainer IE as described in relation to Table 3. As another example, the WLAN access point assistance data may correspond to the assistance data 204 of FIG. 2 and the map data may correspond to the map data 202 of FIG. 2.

A determination is made whether the first reference point is the same as the second reference point, at 706. In response to determining that the first reference point is different from the second reference point, at 706, a location of the first reference point relative to the second reference point is determined, at 708. For example, the mobile device may access reference point information indicating a relative location of the first reference point as referenced to the second reference point. As another example, the mobile device may send a request to a server, such as a location server, for reference point relative location information.

The WLAN access point data and/or the map data may be translated, rotated, or scaled to provide common alignment and scale based on the one or more reference points, at 710. For example, when the first reference point is determined to be the same as the second reference point, at 706, the first and second reference points may be aligned, such as illustrated with respect to the reference point 240 of FIG. 2, and one or more of the access point assistance data and the map data may be rotated and/or scaled to provide common alignment and scale of the data sets. As another example, when the first reference point is determined to not be the same as the second reference point, at 706, the relative locations of the map data structures or the access point locations may be offset based on the relative location of the first reference point relative to the second reference point, in addition to rotating and/or scaling one or more of the access point data and the map data to provide a common alignment and scale based on the first and second reference points.

The combined location data may be used to provide an enhanced location estimation. For example, the mobile device may measure signal strength and/or timing corresponding to one or more of the access points, at 712. The mobile device may estimate its location based on predicted signal strength and/or predicted timing of the WLAN access points as affected by buildings or structures indicated by the map data, at 714. To illustrate, the mobile device may determine that one or more buildings or other structures may cause interference, signal reflection or attenuation, or one or more other effects, for one or more of the access points due to location of one or more access points relative to one or more buildings and structures. The mobile device may be configured to compare measured signal strength and/or timing to a signal strength and/or timing that is predicted based on the combined data of access point locations and structural locations to provide an enhanced estimate as compared to determining location based on access point signal strength and/or timing without using the map data.

Although FIG. 7 shows a method of location estimation using reference points, assistance data and measurements applicable to WLAN APs, it may be appreciated by those skilled in the art, that a similar method may be used to estimate location of a mobile device using reference points, assistance data and measurements applicable to base stations or other terrestrial based transmitting devices (e.g. TV and radio transmitters, Bluetooth devices, Femtocells).

Figure 8:
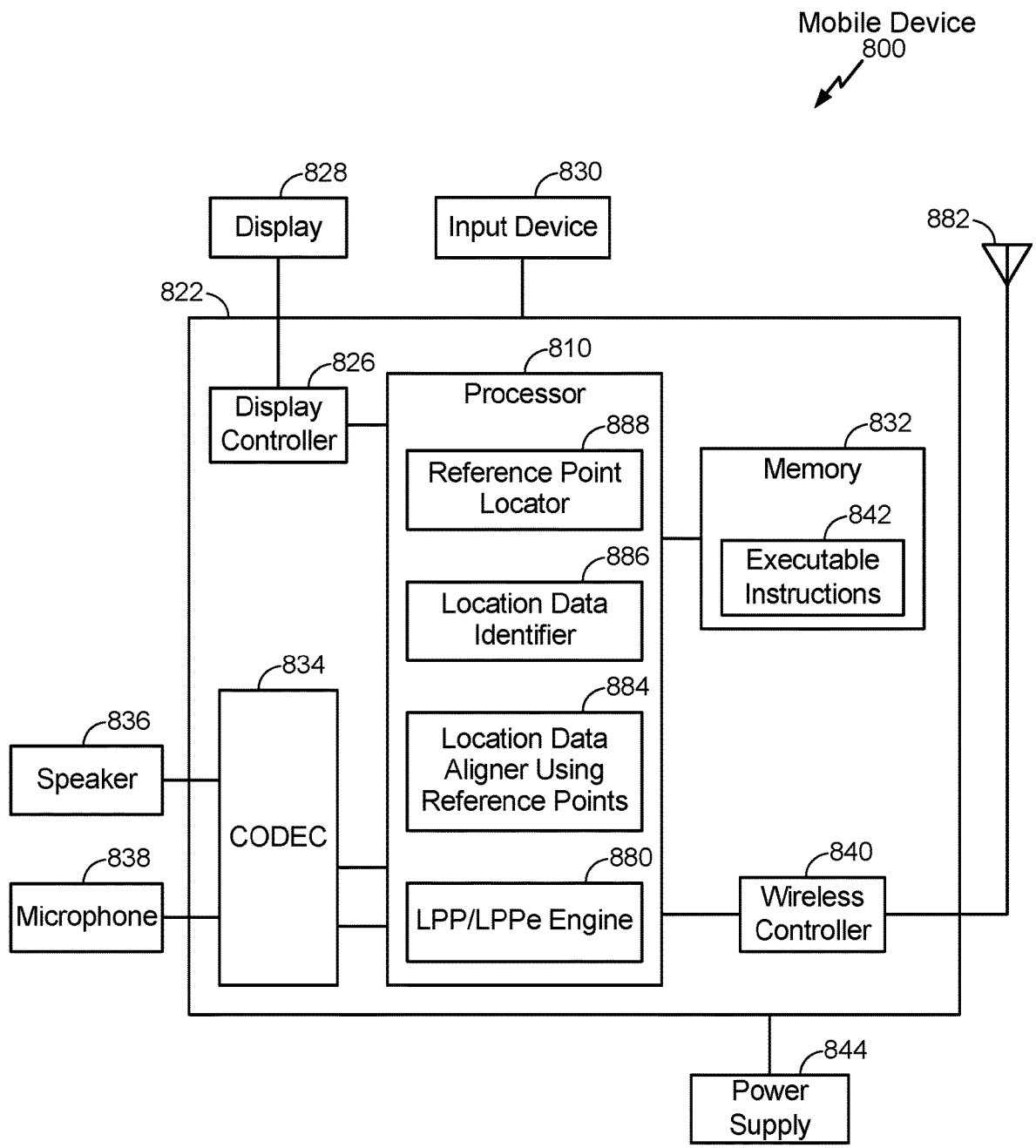
FIG. 8 is a block diagram of a wireless device including a location data aligner using reference points.

FIG. 8 illustrates a block diagram of a particular illustrative embodiment of an electronic device 800 including a location data aligner 884 that uses reference points. The device 800 includes a processor 810 coupled to a memory 832. The processor 810 may be a hardware processor that includes the location data aligner 884, a reference point locator 888, a location data identifier 886, and an LPP/LPPe engine 880. In a particular example, the electronic device 800 corresponds to the mobile device 102 of FIG. 1 or corresponds to the UE 102 of any one or more of FIGS. 3-5.

The reference point locator 888 may include hardware or dedicated circuitry configured to locate reference point identifier fields in received sets of location data. For example, the reference point locator 888 may be configured to receive a first set of location data (e.g. the map data 202 of FIG. 2) and a second set of location data (e.g. the assistance data 204 of FIG. 2) and to locate a first reference point identifier field that is included in the first set of location data (e.g. indicating the reference point 240) and a second reference point identifier field that is included in a second set of location data (e.g. indicating the reference point 240). The first reference point identifier field and the second reference point identifier field may identify a reference point based on a reference point identifier that does not include location coordinates. For example, one or both of the first reference point identifier field and the second reference point identifier field may be as described in Table 5 with respect to FIG. 4 in order to indicate the reference point according to a providerID, a providerAssignedID, and a version, and does not include coordinate information of the reference point. The hardware or dedicated circuitry may be within the processor 810 or may be separate from the processor 810. In other embodiments, at least a portion of the reference point locator 888 may be implemented by the processor 810 executing instructions stored in a non-transitory computer-readable medium, such as executable instructions 842 stored in the memory 832.

The location data identifier 886 may include hardware or dedicated circuitry configured to identify first information in the first set of location data that is associated with the reference point and to identify second information in the second set of location data that is associated with the reference point. For example, the location data identifier 886 may be configured to identify structures of the map data 202 that are located relative to the reference point 240 and to identify base stations in the assistance data 204 that are located relative to the reference point 240. The hardware or dedicated circuitry may be within the processor 810 or may be separate from the processor 810. In other embodiments, at least a portion of the location data identifier 886 may be implemented by the processor 810 executing instructions stored in a non-transitory computer-readable medium, such as executable instructions 842 stored in the memory 832.

The location data aligner 884 may include hardware or dedicated circuitry configured to align multiple sets of data based on one or more reference points, such as by spatially aligning the first set of location data with the second set of location data based on the reference point to associate the first information with the second information. The hardware or dedicated circuitry may be within the processor 810 or may be separate from the processor 810. In other embodiments at least a portion of the location data aligner 884 may be implemented by the processor 810 executing instructions stored in a non-transitory computer-readable medium, such as executable instructions 842 stored in the memory 832. In an illustrative example, the location data aligner 884 is configured to align multiple data sets using reference points as described with respect to any of FIGS. 1-7 or any combination thereof.

The LPP/LPPe engine 880 may include hardware or dedicated circuitry configured to enable communication with a remote location server via an LPP/LPPe communication protocol, such as according to a 3GPP LPP specification and an OMA LPPe specification. For example, the LPP/LPPe engine 880 may be configured to generate the provide capabilities message 304 of FIG. 3, the request assistance data message 402 of FIG. 4, the provide location information message 504 of FIG. 5, or any combination thereof, to be sent by the device 800 to a location server, such as the location server 130. As another example, the LPP/LPPe engine 880 may be configured to process the request capabilities message 302 of FIG. 3, the provide assistance data message 404 of FIG. 4, the request location information message 502 of FIG. 5, or any combination thereof, that may be received by the device 800 from a location server, such as the location server 130. The LPP/LPPe engine 880 may also be configured to support a SUPL session with a remote location server such as the location server 130 of FIGS. 1, 3, 4 and 5 and to support the SUPL ULP protocol according to the OMA SUPL specification for SUPL 1.0, SUPL 2.0 or SUPL 3.0 or some other version of SUPL. The hardware or dedicated circuitry may be within the processor 810 or may be separate from the processor 810. In other embodiments at least a portion of the LPP/LPPe engine 880 may be implemented by the processor 810 executing instructions stored in a non-transitory computer-readable medium, such as executable instructions 842 stored in the memory 832.

FIG. 8 also shows a display controller 826 that is coupled to the processor 810 and to a display 828. A coder/decoder (CODEC) 834 can also be coupled to the processor 810. A speaker 836 and a microphone 838 can be coupled to the CODEC 834.

FIG. 8 also indicates that a wireless controller 840 can be coupled to the processor 810 and to a wireless antenna 882. In a particular embodiment, the processor 810, the display controller 826, the memory 832, the CODEC 834, the wireless controller 840, and the location data aligner 884 are included in a system-in-package or system-on-chip device 822. In a particular embodiment, an input device 830 and a power supply 844 are coupled to the system-on-chip device 822. Moreover, in a particular embodiment, as illustrated in FIG. 8, the display 828, the input device 830, the speaker 836, the microphone 838, the wireless antenna 882, and the power supply 844 are external to the system-on-chip device 822. However, each of the display 828, the input device 830, the speaker 836, the microphone 838, the wireless antenna 882, and the power supply 844 can be coupled to a component of the system-on-chip device 822, such as an interface or a controller.

Figure 9:
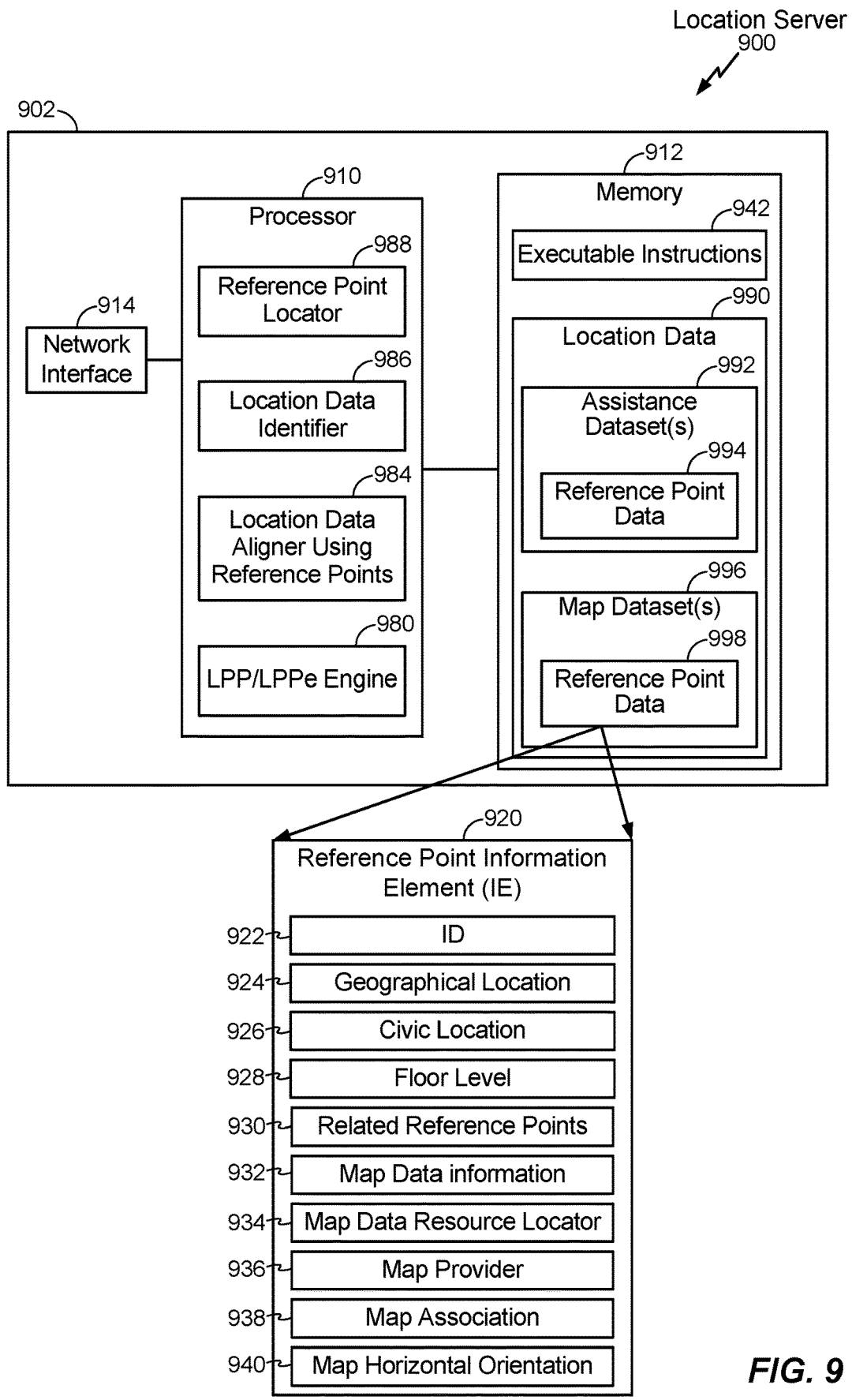
FIG. 9 is a block diagram of a location server including a location data aligner using reference points.

FIG. 9 illustrates a particular embodiment of a location server 900, such as a Secure User Plane Location (SUPL) Location Platform (SLP), that includes a location data aligner 984 that uses reference points. The location server 900 includes a processor 910 coupled to a memory 912 and to a network interface 914. The processor 910 may be a hardware processor that includes an LPP/LPPe engine 980, a reference point locator 988, a location data identifier 986, and the location data aligner 984. In a particular example, the location server 900 may correspond to the location server 130 of FIG. 1 or FIGS. 3-5. The processor 910, the network interface 914, and the memory 912 may be included in a system-in-package or system-on-chip device 902.

The reference point locator 988 may include hardware or dedicated circuitry configured to locate reference point identifier fields in received sets of location data. For example, the reference point locator 988 may be configured to receive a first set of location data (e.g. the map data 202 of FIG. 2) and a second set of location data (e.g. the assistance data 204 of FIG. 2) and to locate a first reference point identifier field that is included in the first set of location data (e.g. indicating the reference point 240) and a second reference point identifier field that is included in a second set of location data (e.g. indicating the reference point 240). The first reference point identifier field and the second reference point identifier field may identify a reference point based on a reference point identifier that does not include location coordinates. For example, one or both of the first reference point identifier field and the second reference point identifier field may be as described in Table 5 with respect to FIG. 4 in order to indicate the reference point according to a providerID, a providerAssignedID, and a version, and that does not include coordinate information of the reference point. The hardware or dedicated circuitry may be within the processor 910 or may be separate from the processor 910. In other embodiments, at least a portion of the reference point locator 988 may be implemented by the processor 910 executing instructions stored in a non-transitory computer-readable medium, such as executable instructions 942 stored in the memory 912.

The location data identifier 986 may include hardware or dedicated circuitry configured to identify first information in the first set of location data that is associated with the reference point and to identify second information in the second set of location data that is associated with the reference point. For example, the location data identifier 986 may be configured to identify structures of the map data 202 that are located relative to the reference point 240 and to identify base stations in the assistance data 204 that are located relative to the reference point 240. The hardware or dedicated circuitry may be within the processor 910 or may be separate from the processor 910. In other embodiments, at least a portion of the location data identifier 986 may be implemented by the processor 910 executing instructions stored in a non-transitory computer-readable medium, such as executable instructions 942 stored in the memory 912.

The location data aligner 984 may include hardware or dedicated circuitry configured to align multiple sets of data based on one or more reference points, such as by spatially aligning the first set of location data with the second set of location data based on the reference point to associate the first information with the second information. The hardware or dedicated circuitry may be within the processor 910 or may be separate from the processor 910. In other embodiments at least a portion of the location data aligner 984 may be implemented by the processor 910 executing instructions stored in a non-transitory computer-readable medium, such as executable instructions 942 stored in the memory 912. In an illustrative example, the location data aligner 984 is configured to align multiple data sets using reference points as described with respect to any of FIGS. 1-7 or any combination thereof.

The LPP/LPPe engine 980 may include hardware or dedicated circuitry configured to enable communication with a mobile device via an LPP/LPPe communication protocol, such as according to a 3GPP LPP specification and an OMA LPPe specification. For example, the LPP/LPPe engine 980 may be configured to process the provide capabilities message 304 of FIG. 3, the request assistance data message 402 of FIG. 4, the provide location information message 504 of FIG. 5, or any combination thereof, received at the location server 900 from a mobile device, such as the mobile device 102. As another example, the LPP/LPPe engine 980 may be configured to generate the request capabilities message 302 of FIG. 3, the provide assistance data message 404 of FIG. 4, the request location information message 502 of FIG. 5, or any combination thereof, that may be sent to a mobile device via one or more location sessions, such as the location session 132 of FIG. 1. The LPP/LPPe engine 980 may also be configured to support a SUPL session with a remote mobile device such as the mobile device 102 of FIG. 1 and the UE 102 of FIGS. 3, 4 and 5 and to support the SUPL ULP protocol according to the OMA SUPL specification for SUPL 1.0, SUPL 2.0 or SUPL 3.0 or some other version of SUPL. The hardware or dedicated circuitry may be within the processor 910 or may be separate from the processor 910. In other embodiments at least a portion of the LPP/LPPe engine 980 may be implemented by the processor 910 executing instructions stored in a non-transitory computer-readable medium, such as the executable instructions 942 stored in the memory 912.

The memory 912 includes location data 990. The location data 990 includes one or more assistance datasets 992 that include reference point data 994. For example, an assistance dataset 992 may include identities of a set of base stations and locations of the base stations relative to one or more reference points. The location data 990 may also include one or more map datasets 996 that include reference point data 998. For example, a map dataset 996 may include one or more reference points or may include location information relative to one or more reference points.

The reference point data 994, 998 may include one or more reference point definitions, such as provided via a representative reference point IE 920. A reference point identifier (ID) 922 may be a unique identifier that is associated with reference point information. In the embodiment illustrated in FIG. 9, the reference point information may include a reference point geographical location field 924 that provides a geodetic location of the reference point, a reference point civic location field 926 that provides a civic location information description of the reference point, and/or a reference point floor level field 928 that provides a floor level of the reference point. The reference point information may also include a related reference points field 930 that includes information regarding one or more related reference points, a reference point map data information field 932 that provides a map reference for the reference point, a reference point map data resource locator field 934 that provides a reference to two-dimensional or three-dimensional map data, a reference point map provider field 936 that identifies a map data provider, a reference point map association field 938 that associates the reference point to a particular location on a map, and/or a reference point map horizontal orientation field 940 that specifies a horizontal orientation of a map coordinate system. In a particular embodiment, the reference point IE 920 is an OMA LPPe reference point IE, such as described in Table 4 with respect to FIG. 4 and FIG. 5.

Figure 10:
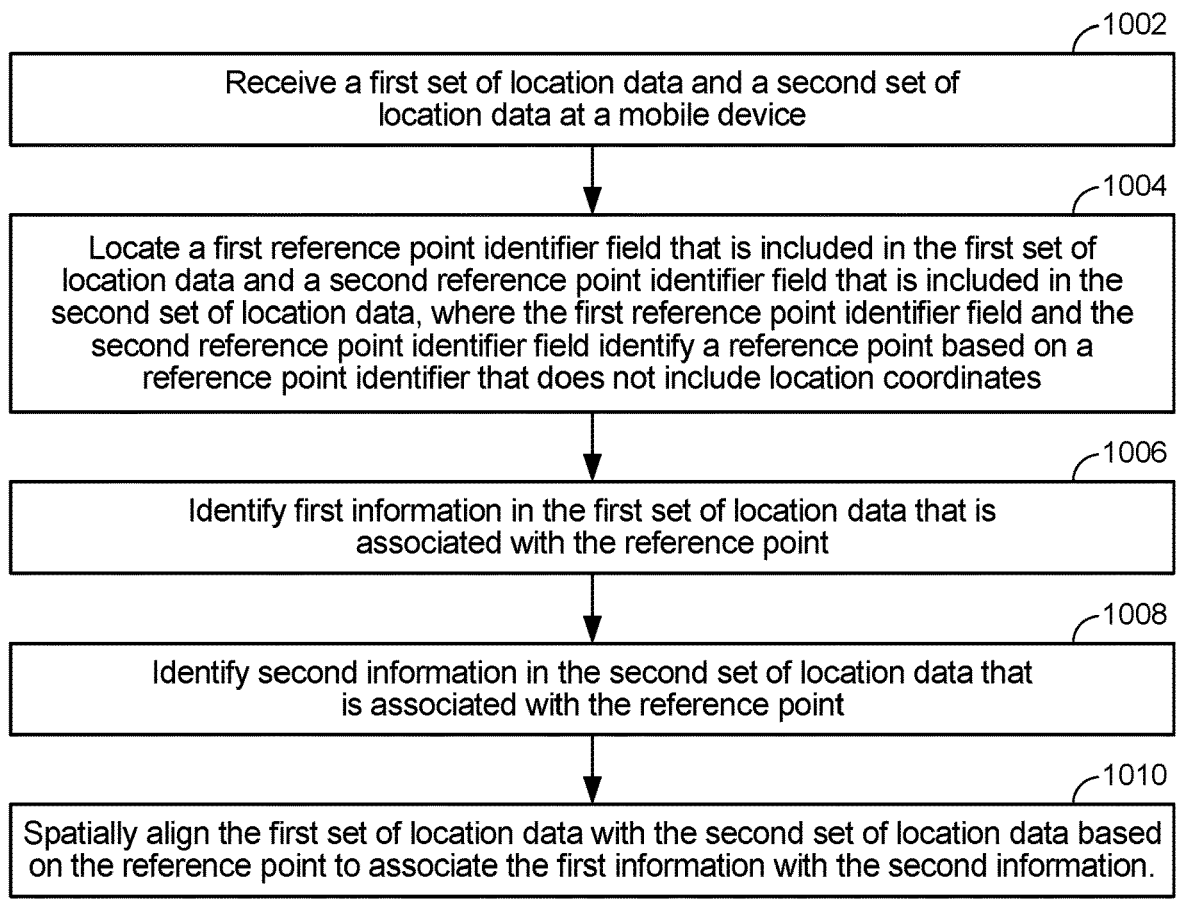
FIG. 10 is a flow chart of a particular embodiment of a method of using reference points at a mobile device.

FIG. 10 depicts an embodiment of a method of using reference points. A first set of location data and a second set of location data are received at a mobile device, 1002. For example, the first set of location data may be the map data 202 and the second set of location data may be the assistance data 204 of FIG. 2. The first set of location data and the second set of location data may be received at a mobile device such as the mobile device 102 of FIG. 1 or the device 800 of FIG. 8.

A common reference point identifier that is included in the first and second sets of location data may be located. The common reference point identifier may identify a common reference point. For example, a first reference point identifier field that is included in the first set of location data may be located and a second reference point identifier field that is included in the second set of location data may be located, at 1004. The first reference point identifier field and the second reference point identifier field may identify a reference point based on a reference point identifier that does not include location coordinates. For example, the first reference point identifier field may indicate the reference point 240 in the map data 202 of FIG. 2 and the second reference point identifier field may indicate the reference point 240 in the assistance data 204. To illustrate, one or both of the first reference point identifier field and the second reference point identifier field may be as described in Table 5 with respect to FIG. 4 that indicate the reference point according to a providerID, a providerAssignedID, and a version and that does not include coordinate information of the reference point.

First information that is associated with the reference point is identified in the first set of location data, at 1006. For example, the first information may include map data indicating relative positions of structures with respect to the reference point. To illustrate, the map data 202 may include locations of structures and other elements relative to the reference point 240.

Second information that is associated with the reference point is identified in the second set of location data, at 1008. For example, the second information may include assistance data indicating relative positions of signal sources with respect to the reference point. To illustrate, the assistance data 204 may include locations of base stations 222, 224, 226, 228 relative to the reference point 240.

Figure 11:
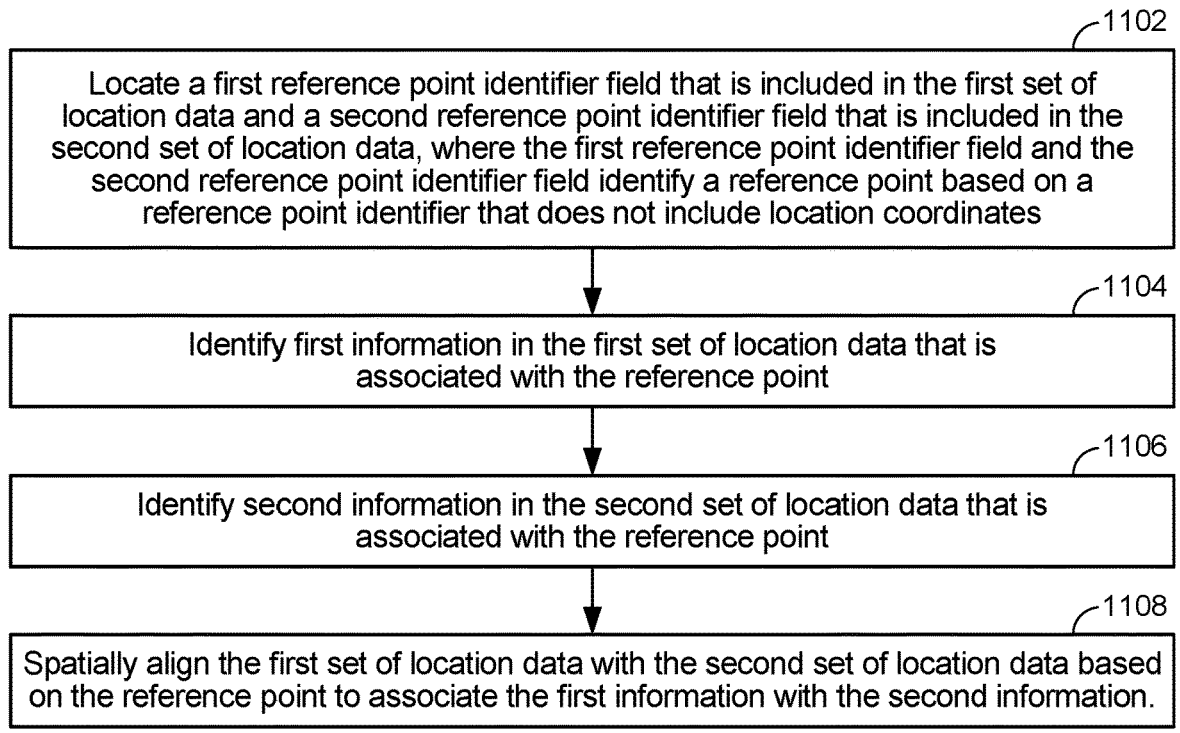
FIG. 11 is a flow chart of a particular embodiment of a method of using reference points at a location server.

The first set of location data is spatially aligned with the second set of location data based on the reference point (that is common to the first and second sets of location data) to associate the first information with the second information, at 1010. For example, spatially aligning the first set of location data with the second set of location data may include translating at least one of the first set of location data and the second set of location data to align the reference point in the first set of location data with the reference point in the second set of location data. Spatially aligning the first set of location data with the second set of location data may include rotating at least one of the first set of location data and the second set of location data to align an orientation of the first set of location data with an orientation of the second set of location data. Spatially aligning the first set of location data with the second set of location data may include scaling at least one of the first set of location data and the second set of location data to align a scale of the first set of location data with a scale of the second set of location data. When the first set of location data and the second set of location data each include a first reference point and a second reference point, spatially aligning the first set of location data with the second set of location data may include translating at least one of the first set of location data and the second set of location data to align the first reference point in the first set of location data with the first reference point in the second set of location data. At least one of the first set of location data and the second set of location data may be rotated and/or scaled to align the second reference point in the first set of location data with the second reference point in the second set of location data while maintaining alignment of the first reference point in the first set of location data with the first reference point in the second set of location data FIG. 11 depicts another embodiment of a method of using reference points that may be performed by a location server, such as the location server 130 of FIG. 1 or the location server 900 of FIG. 9. A first reference point identifier that is included in a first set of location data and a second reference point identifier that is included in a second set of location data may be located, where the first reference point identifier and the second reference point identifier identify a common reference point. For example, a first reference point identifier field that is included in the first set of location data may be located and a second reference point identifier field that is included in the second set of location data may be located, at 1102. The first reference point identifier field and the second reference point identifier field identify a reference point based on a reference point identifier that does not include location coordinates. For example, the first reference point identifier field may indicate the reference point 240 in the map data 202 of FIG. 2 and the second reference point identifier field may indicate the reference point 240 in the assistance data 204. To illustrate, one or both of the first reference point identifier field and the second reference point identifier field may be as described in Table 5 with respect to FIG. 4 and FIG. 5 that indicate the reference point according to a providerID, a providerAssignedID, and a version and that does not include coordinate information of the reference point.

First information that is associated with the reference point is identified in the first set of location data, at 1104. For example, the first information may include map data indicating relative positions of structures with respect to the reference point (i.e. the identified reference point common to the first and second sets of location data). To illustrate, the map data 202 may include locations of structures and other elements relative to the reference point 240.

Second information that is associated with the reference point is identified in the second set of location data, at 1106. For example, the second information may include assistance data indicating relative positions of signal sources with respect to the reference point. To illustrate, the assistance data 204 may include locations of base stations 222, 224, 226, 228 relative to the reference point 240.

The first set of location data is spatially aligned with the second set of location data based on the reference point to associate the first information with the second information, at 1108. For example, spatially aligning the first set of location data with the second set of location data may include at least one of translating, rotating, and scaling at least one of the first set of location data and the second set of location data.

The first information may be associated with the second information to generate a location estimate of a mobile device. For example, a location information message including signal measurements may be received from the mobile device. The location estimate may be further based on the signal measurements from the mobile device.

In conjunction with the disclosed systems and methods of FIGS. 1-11, in some embodiments, an apparatus includes means for receiving a first set of location data and a second set of location data and for locating a common reference point identifier that is included in the first set of location data and in the second set of location data (e.g. the reference point locator 888 of FIG. 8 and the reference point locator 988 of FIG. 9). The common reference point identifier identifies a common reference point and may not include location coordinates. The apparatus may include means for identifying first information in the first set of location data that is associated with the common reference point and for identifying second information in the second set of location data that is associated with the common reference point (e.g. the location data identifier 886 of FIG. 8 and the location data identifier 986 of FIG. 9). The apparatus may include means for spatially aligning the first set of location data with the second set of location data based on the common reference point to associate the first information with the second information (e.g. the location data aligner 884 of FIG. 8 and the location data aligner 984 of FIG. 9). The apparatus may include means for receiving the first set of location data and the second set of location data via a wireless message (e.g. the wireless controller 840 of FIG. 8). For example, the first set of location data and the second set of location data may be received at the mobile device during a location session established between the mobile device and a location server.

In conjunction with the disclosed systems and methods of FIGS. 1-11, a non-transitory computer readable medium (e.g. the memory 832 of FIG. 8, the memory 912 of FIG. 9 includes instructions (e.g., the instructions 842 of FIG. 8, the instructions 942 of FIG. 9) executable by a computer (e.g., the processor 810 of FIG. 8, the processor 910 of FIG. 9). According to a particular illustrative embodiment, the instructions, when executed by a processor, cause the processor to receive a first set of location data and a second set of location data and to locate a common reference point identifier that is included in the first set of location data and that is included in the second set of location data. The common reference point identifier may identify a reference point and may not include location coordinates. The instructions may cause the processor to identify first information in the first set of location data that is associated with the common reference point, identify second information in the second set of location data that is associated with the common reference point, and spatially align the first set of location data with the second set of location data based on the common reference point to associate the first information with the second information. The first set of location data and the second set of location data may be received at a mobile device during a location session established between a mobile device and a location server.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
sending, by a mobile device, a message to a location server, the message indicating a reference point capability of the mobile device according to a positioning protocol, wherein a reference point corresponds to a geographically fixed location, wherein the indication of the reference point capability is distinct from an indication of a measurement capability of the mobile device for positioning, and wherein the reference point capability of the mobile device:
  (i) is used for location reporting for a determined mobile device location relative to the reference point, and
  (ii) supports receiving assistance data that comprises 1) a first data set comprising map data and 2) a second data set indicating characteristics of a base station, wherein the geographically fixed location indicated in the reference point capability of the mobile device is common to the first data set and the second data set, and wherein receiving assistance data is supported by combining the first data set and the second data set by spatially aligning the first data set and the second data set using the geographically fixed location.

2. The method of claim 1, wherein the reference point capability includes a list of one or more reference point provider identifiers supported by the mobile device for location reporting.

3. The method of claim 1, wherein the positioning protocol is an Open Mobile Alliance (OMA) Long Term Evolution (LTE) Positioning Protocol Extensions (LPPe) protocol and wherein the message is a LPP/LPPe Provide Capabilities message.

4. The method of claim 1, wherein the reference point capability further includes a type of reference point supported by the mobile device, wherein the type of reference point is one or more of a geographic, a civic, or a provider-specific reference point.

5. The method of claim 4, wherein the provider-specific reference point comprises a map-based reference point.

6. The method of claim 4, wherein the reference point capability further includes whether the mobile device is able to support mobile device location reporting relative to reference points identified by a particular set of reference point providers or from other reference point providers.

7. The method of claim 6, wherein the reference point capability further includes associated attributes within reference point assistance data for each reference point provider that the mobile device supports.

8. The method of claim 6, wherein the reference point capability further includes an indication of whether the mobile device supports map data information for a reference point provider.

9. The method of claim 8, wherein the reference point capability further includes information specific to the reference point provider concerning a type of map data supported by the mobile device.

10. The method of claim 1, further comprising:
sending, by the mobile device, a message to the location server, the message indicating a request for assistance data and including a reference point indication, wherein the reference point indication includes a list of reference point types in an order of preference of the mobile device.

11. The method of claim 10, wherein the list includes an indicator of a reference point provider.

12. The method of claim 1, further comprising:
sending, by the mobile device, a message including location information to the location server, wherein the location information indicates a reference point and indicates the determined mobile device location in a local coordinate system having an origin defined by the reference point.

13. The method of claim 1, wherein the reference point capability is indicated using an information element designated for indicating reference point capability support.

14. The method of claim 1, wherein assistance data further includes a unique identifier of the reference point and version of the reference point.

15. The method of claim 1, wherein the assistance data further includes an indication of a default reference point, wherein the reference point comprises the default reference point.

16. The method of claim 1, wherein the reference point comprises a point location.

17. A mobile device comprising:
a wireless interface configured to wirelessly communicate with a location server in a wireless network,
at least one processor coupled to the wireless interface and configured to send a message to the location server with the wireless interface, the message indicating a reference point capability of the mobile device according to a positioning protocol, wherein a reference point corresponds to a geographically fixed location, wherein the indication of the reference point capability is distinct from an indication of a measurement capability of the mobile device for positioning, and wherein the reference point capability of the mobile device:
  (i) is used for location reporting for a determined mobile device location relative to the reference point, and
  (ii) supports receiving assistance data that comprises 1) a first data set comprising map data and 2) a second data set indicating characteristics of a base station, wherein the geographically fixed location indicated in the reference point capability of the mobile device is common to the first data set and the second data set, and wherein receiving assistance data is supported by combining the first data set and the second data set by spatially aligning the first data set and the second data set using the geographically fixed location.

18. The mobile device of claim 17, wherein the reference point capability includes a list of one or more reference point provider identifiers supported by the mobile device for location reporting.

19. The mobile device of claim 17, wherein the positioning protocol is an Open Mobile Alliance (OMA) Long Term Evolution (LTE) Positioning Protocol Extensions (LPPe) protocol and wherein the message is a LPP/LPPe Provide Capabilities message.

20. The mobile device of claim 17, wherein the reference point capability further includes a type of reference point supported by the mobile device, wherein the type of reference point is one or more of a geographic, a civic, or a provider-specific reference point.

21. The mobile device of claim 20, wherein the provider-specific reference point comprises a map-based reference point.

22. The mobile device of claim 20, wherein the reference point capability further includes whether the mobile device is able to support mobile device location reporting relative to reference points identified by a particular set of reference point providers or from other reference point providers.

23. The mobile device of claim 22, wherein the reference point capability further includes associated attributes within reference point assistance data for each reference point provider that the mobile device supports.

24. The mobile device of claim 22, wherein the reference point capability further includes an indication of whether the mobile device supports map data information for a reference point provider.

25. The mobile device of claim 24, wherein the reference point capability further includes information specific to the reference point provider concerning a type of map data supported by the mobile device.

26. The mobile device of claim 17, wherein the at least one processor is further configured to send, a message to the location server with the wireless interface, the message indicating a request for assistance data and including a reference point indication, wherein the reference point indication includes a list of reference point types in an order of preference of the mobile device.

27. The mobile device of claim 26, wherein the list includes an indicator of a reference point provider.

28. The mobile device of claim 17, wherein the at least one processor is further configured to send a message including location information to the location server with the wireless interface, wherein the location information indicates a reference point and indicates the determined mobile device location in a local coordinate system having an origin defined by the reference point.

29. A mobile device comprising:
  means for sending, by the mobile device, a message to a location server, the message indicating a reference point capability of the mobile device according to a positioning protocol, wherein a reference point corresponds to a geographically fixed location, wherein the indication of the reference point capability is distinct from an indication of a measurement capability of the mobile device for positioning, and wherein the reference point capability of the mobile device:
  (i) is used for location reporting for a determined mobile device location relative to the reference point, and
  (ii) supports receiving assistance data that comprises 1) a first data set comprising map data and 2) a second data set indicating characteristics of a base station, wherein the geographically fixed location indicated in the reference point capability of the mobile device is common to the first data set and the second data set, and wherein receiving assistance data is supported by combining the first data set and the second data set by spatially aligning the first data set and the second data set using the geographically fixed location.

30. A non-transitory computer readable medium comprising instructions, which when executed by a processor cause the processor to:
  send, by a mobile device, a message to a location server, the message indicating a reference point capability of the mobile device according to a positioning protocol, wherein a reference point corresponds to a geographically fixed location, wherein the indication of the reference point capability is distinct from an indication of a measurement capability of the mobile device for positioning, and wherein the reference point capability of the mobile device:
  (i) is used for location reporting for a determined mobile device location relative to the reference point, and
  (ii) supports receiving assistance data that comprises 1) a first data set comprising map data and 2) a second data set indicating characteristics of a base station, wherein the geographically fixed location indicated in the reference point capability of the mobile device is common to the first data set and the second data set, and wherein receiving assistance data is supported by combining the first data set and the second data set by spatially aligning the first data set and the second data set using the geographically fixed location.

* * * * *